United States Patent
Myojo

(10) Patent No.: US 7,257,099 B2
(45) Date of Patent: Aug. 14, 2007

(54) CONTROL APPARATUS FOR CONTROLLING WIRELESS COMMUNICATION SYSTEM, COMMUNICATION APPARATUS AND CONTROL METHOD THEREFOR

(75) Inventor: Toshihiko Myojo, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 639 days.

(21) Appl. No.: 10/889,832

(22) Filed: Jul. 13, 2004

(65) Prior Publication Data
US 2005/0018706 A1 Jan. 27, 2005

(30) Foreign Application Priority Data
Jul. 22, 2003 (JP) ............................. 2003-200073

(51) Int. Cl.
*H04Q 7/00* (2006.01)
(52) U.S. Cl. ................... 370/329; 370/341; 370/368; 370/346
(58) Field of Classification Search ................ 370/329, 370/341, 346, 337, 347, 431, 442, 445, 447, 370/443, 449, 468, 348
See application file for complete search history.

(56) References Cited

U.S. PATENT DOCUMENTS

| 2002/0080739 A1 | 6/2002 | Kuwahara | 370/333 |
| 2002/0080855 A1 | 6/2002 | Watanabe | 375/132 |
| 2005/0002373 A1* | 1/2005 | Watanabe et al. | 370/346 |
| 2006/0029073 A1* | 2/2006 | Cervello et al. | 370/389 |
| 2006/0092868 A1* | 5/2006 | Meier | 370/312 |
| 2006/0246932 A1* | 11/2006 | Liang | 455/515 |
| 2007/0058665 A1* | 3/2007 | Ho et al. | 370/447 |

FOREIGN PATENT DOCUMENTS

JP  2003-174453  6/2003

OTHER PUBLICATIONS

Magazine article, "Full Investigation on the Suddenly Growing Wireless LAN 11g", ASCII magazine, ASCII Corporation Japan, vol. 310, Apr. 2003, pp. 89-104. Relevant portions of an English translation is included.

* cited by examiner

*Primary Examiner*—Ajit Patel
(74) *Attorney, Agent, or Firm*—Morgan & Finnegan, LLP

(57) ABSTRACT

A control apparatus for controlling a wireless communication system, which provide enhanced communication efficiency when a single apparatus performs a plurality of wireless communications. A timing signal generation logic circuit generates transmission and reception timing control signals for controlling timing of transmission and reception by respective ones of a Bluetooth module and a wireless LAN module based on respective states thereof. MAC sections of the respective modules control transmission and reception by the respective ones of the Bluetooth module and the wireless LAN module, based on the respective corresponding transmission and reception timing control signals generated by the timing signal generation logic circuit.

11 Claims, 12 Drawing Sheets

CONTROL APPARATUS FOR CONTROLLING WIRELESS COMMUNICATION SYSTEM, COMMUNICATION APPARATUS AND CONTROL METHOD THEREFOR

CROSS REFERENCE TO RELATED APPLICATION

This application claims priority from Japanese Patent Application No. 2003-200073 filed Jul. 22, 2003, which is hereby incorporated by reference.

BACKGROUND OF THE INVENTION

1. Field of the Invention

The present invention relates to a control apparatus for controlling a wireless communication system, a communication apparatus, and a control method therefor.

2. Description of the Related Art

Recently, in office environments where networking is advancing with widespread use of the Internet, there are growing needs for replacing part of wired LANs (Local Area Networks) typified by the Ethernet (registered trademark) with wireless LANs that dispense with complicated wiring.

Further, a system has conventionally been proposed (e.g. in US Published Patent Publications No. 2002-0080739 and No. 2002-0080855) in which when a Bluetooth device and a wireless LAN use the same frequency range, the frequency range itself is divided so as to enable one of them to avoid the use of a frequency range being used by the other.

Further, a wireless LAN using an ISM (Industrial, Scientific Medical) band has already been standardized as the IEEE 802.11 standard, and the IEEE 802.11b standard adapted to increased transmission speed has also been put to practical use.

The MAC (Media Access Control) of the IEEE 802.11 standard uses a CSMA/CA (Carrier Sense Multiple Access with Collision Avoidance) protocol, which prescribes that, in transmitting data, detection of a carrier on a wireless transmission medium should be performed; if the carrier is detected, the data transmitting operation should be temporarily stopped (data transmission should be deferred); and after the carrier ceases to be detected, the data transmitting operation should be resumed upon the lapse of a randomly chosen transmission waiting time (random back-off time). Further, to reduce the collision probability of data, the MAC of the IEEE 802.11 standard (hereinafter referred to as "the IEEE 802.11 MAC") uses the technique of Distributed Coordination Function (DCF) in which a data transmission request signal RTS (request to send) is transmitted in advance, and after receiving a transmission permission signal CTS (clear to send), transmission of a data packet is performed, and confirmation of the transmission of the data packet is carried out by receiving an acknowledgement (ACK). The IEEE 802.11 MAC thus solves a problem caused by contention or collision on the wireless transmission medium.

Furthermore, the IEEE 802.11 MAC defines the Point Coordination Function (PCF) as a means for securing a contention free period for an access point (AP) where access concentration of a plurality of wireless communication terminals can occur.

As shown in FIG. 11, the PCF secures a contention free period on a wireless medium by causing an access point to periodically transmit a beacon containing contention avoidance time information. A NAV (Network Allocation Vector) obtained, as a contention free period, in response to the beacon is set to a CFP max duration, whereby transmission from stations (STAs) for which polling is inhibited. The access point performs polling to wireless communication terminals on the network during the contention free period, to thereby license the terminals to carry out transmission and hence realize contention free transmission. The value of the NAV is updated whenever a beacon is transmitted.

A time interval between frames transmitted to the medium is defined as an IFS (Inter Frame Space), and a wireless communication terminal uses a carrier sense function in a prescribed IFS interval to determine whether the medium is idle. The PCF defines the time of a SIFS (Short Inter Frame Space) as a standby time for awaiting reception of a response to polling by the access point. When no response is obtained within the SIFS time period after transmission of a polling packet, the next polling packet is immediately transmitted.

The PCF defines a PIFS (PCF Inter Frame Space) set to a longer time period than the SIFS, and when the medium has been idle over this time period, the access point is allowed to send a CF-polling frame to a next station. Further, By setting the beacon repetition period to a longer time period than the contention free period, the access point can operate on both the PCF and the DCF. Furthermore, when it is determined that there is no data to be transmitted within a secured contention free period, a CF-END (Contention Free-END) signal is transmitted to terminate the contention free period, whereby a time period before transmission of the next beacon can be used as the DCF period.

In the IEEE 802.11 standard (hereinafter referred to as "the wireless LAN"), a plurality of frequency channels are defined, whereby a plurality of access points can be operated using the respective different frequency channels in an environment where the access points are independent of each other and free of mutual interference.

On the other hand, in the digital wireless communication technology, various methods have been put to practical use, and with a view to replacement of cables connecting between communication apparatuses and achievement of low costs and low power consumption, researches on Bluetooth devices using a simplified wireless communication method are being carried out.

In the Bluetooth technology, the communication procedure is determined as a profile depending on the kind of data to be handled, whereby wireless connection between various kinds of communication apparatuses or devices is achieved. For example, in the case of establishing connection to a main LAN within an office, the connection can be achieved via an access point using a LAN or PAN (Personal Area Network) profile, while in the case of establishing connection to the main LAN from outside the office, the connection can be achieved via a cellular phone with the Bluetooth technology, using a DUN (Dial Up Network) profile.

As is apparent from the above fact, the Bluetooth technology is expected to be widely used in portable information apparatuses and devices, such as cellular phones, notebook PCs (Personal Computers), and PDAs (Personal Digital Assistants), for business use. The Bluetooth technology also uses an ISM band, similarly to the wireless LAN.

The Bluetooth network topology is a star network of centralized control type, and communication apparatuses and devices which are linked with each other include a single control station, referred to as the master, which controls data traffic, and slaves which perform data transfer under the control of the master.

To establish a link, each slave synchronizes the frequency of a communication channel and transmission/reception timing using a hopping pattern generated from a BD_ADDR (Bluetooth Device Address) of the master, in clock timing synchronized with a system clock (native clock) of the master.

The BD_ADDR is uniquely assigned to each communication apparatus or device, so that a plurality of communication apparatuses and devices can use the same band and perform communication using different hopping patterns, which makes it possible to operate Bluetooth devices independently as in the case of wireless LAN devices.

In the MAC defined by the Bluetooth technology, up to a maximum of seven slaves can be connected to a single master, and as shown in FIG. 12, the master sequentially executes polling control of the linked slaves to thereby give each slave a license to transmit.

When the master has data to send to a specific slave, a polling signal from the master is sent as a data packet to the slave, whereas when the master has no data to send to the slave, the polling signal from the master is sent as a polling packet to the slave. When receiving one of the packets, the slave performs transmission to the master using a time slot immediately after completion of the packet reception.

The transmission of one packet can extend up to a maximum of five time slots in one direction. This extension is possible for a packet transmitted from the master to a slave or from a slave to the master, or for packets transmitted in both the directions, and assignment of the extended slots is finally determined by a link manager protocol of the master.

In addition to the packet data transmission using the so-called ACL (Asynchronous Connectionless) link described above, the Bluetooth technology has realized voice communications using an SCO (Synchronous Connection Oriented) link that reserves communication slots to be used. When the SCO link is used, the master executes polling control as in the case of using the ACL link, but in the SCO link, the polling period is fixed so as to ensure real-time communications.

Further, the Bluetooth technology defines a power saving mode for temporarily stopping communicating operation when there is no data to be transferred after link establishment. In the power saving mode, a master suspends polling control of a slave having entered the power saving mode.

On the other hand, the slave saves electric power by stopping transmission/reception operation over a predetermined time period.

In the above-described background, these two different wireless communication techniques are both expected to be employed in portable information devices and apparatuses, such as notebook PCs. However, the two wireless communication methods are not compatible with each other, and therefore when Bluetooth-based communication is carried out during execution of wireless LAN-based communication for example, a Bluetooth signal and a wireless LAN signal can overlap each other, which causes interference.

At present, both the IEEE and the Bluetooth SIG (Special Interest Group) are studying the method of avoiding this interference. For example, a method is under study in which the states of wireless LAN-based communication and Bluetooth-based communication are monitored on the respective MAC levels of the wireless LAN and the Bluetooth, and one of the two communications is suspended during execution of the other.

However, the above-described conventional interference avoiding method is studied on the premise that each portable information device or apparatus such as a note PC is equipped with communication interfaces of the two different kinds, and therefore the method does not suffice to provide desired characteristics for an access point implementing both of the two different methods. More specifically, the Bluetooth technology allows up to a maximum of only seven slaves to be connected to a single master, and therefore an office or the like where communication terminals concentrate necessitates provision of a plurality of Bluetooth interfaces. On the other hand, if a wireless LAN is in an environment where a large amount of traffic occurs, it can be envisaged that the wireless LAN is equipped with a plurality of wireless LAN interfaces for decentralization of the traffic.

In the above-described conventional interference avoiding method, the two different kinds of wireless communication methods can be used together by controlling transmission/reception timing for each of the two kinds of wireless communication methods. However, this method does not contemplate provision of a plurality of wireless LAN interfaces and a plurality of Bluetooth interfaces, and therefore is incapable of controlling communication timing between interfaces of the same communication method or between interfaces of the different communication methods, which makes it difficult to avoid interference between communications according to the different wireless communication methods.

SUMMARY OF THE INVENTION

It is a first object of the present invention to provide a control apparatus for controlling a wireless communication system, a communication apparatus, and a control method therefor, which provide enhanced communication efficiency when a single apparatus performs a plurality of wireless communications.

It is a second object of the present invention to provide a control apparatus for controlling a wireless communication system, a communication apparatus, and a control method, which are capable of easily controlling transmission/reception timing in wireless communications according to different wireless communication methods.

To attain the above objects, in a first aspect of the present invention, there is provided a control apparatus that controls a wireless communication system having a plurality of wireless communication modules that employ different wireless communication methods, comprising a transmission and reception timing control signal-generating device that generates transmission and reception timing control signals for controlling timing of transmission and reception by respective ones of the wireless communication modules that employ the different wireless communication methods, based on respective states of communications of the respective ones of the wireless communication modules, and a transmission and reception control device that controls the transmission and reception by the respective ones of the wireless communication modules according to respective corresponding ones of the different wireless communication methods, based on respective corresponding ones of the transmission and reception timing control signals generated by the transmission and reception timing control signal-generating device.

To attain the above objects, in a second aspect of the present invention, there is provided a control apparatus that controls a wireless communication system having at least one first wireless communication module capable of performing communication according to a first communication process, and communication according to a second communication process, and at least one second wireless communication module, comprising a determining device that determines a first time period over which the first wireless communication module is allowed to perform communication according to the first communication process and a second time period over which the first wireless communication module is allowed to perform communication according to the second communication process, and an assignment device that assigns the second time period to the second wireless communication module, as a communication time period in which the second wireless communication module is allowed to perform communication.

Preferably, the first wireless communication module and the second wireless communication module perform communication according to respective wireless communication methods different from each other.

Preferably, the first communication process is a polling communication process, and the second communication process is a non-polling communication process.

Preferably, the first wireless communication module alternately performs communication according to the first communication process and communication by the second communication process.

Preferably, the assignment device inhibits the second wireless communication module over the first time period from performing communication.

Preferably, the assignment device outputs a communication permission signal to each of the first and second wireless communication modules to thereby permit each of the first and second wireless communication modules to perform communication.

Preferably, the first time period changes in termination timing thereof according to timing in which communication by the first wireless communication module with all parties terminates in the first time period.

Preferably, the first and second wireless communication modules perform communication using frequency bands overlapping each other.

To attain the above objects, in a third aspect of the present invention, there is provided a communication apparatus including a control section that controls at least one first wireless communication section and at least one second wireless communication section, comprising a determining device that determines a time period during which the first wireless communication section performs predetermined communication, and a permission device that permits the second wireless communication section to perform communication, based on a result of the determination by the determining device.

Preferably, the determining device determines a time period over which the first communication section is to perform communication with contention, with another communication apparatus.

Preferably, the permission device inhibits the at least one second wireless communication section from performing communication during a time period over which the first wireless communication section performs contention-free communication with another communication apparatus, and permits the second wireless communication section to perform communication during a time period over which the first wireless communication section is to perform communication with contention, with another communication apparatus.

To attain the above objects, in a fourth aspect of the present invention, there is provided a method of controlling at least one first wireless communication section and at least one second wireless communication section provided in a communication apparatus, comprising the steps of inhibiting the second wireless communication section from performing communication during a time period over which the first wireless communication section performs communication according to a polling communication process, and permitting the second wireless communication section to perform communication during a time period over which the first wireless communication section is to perform communication according to a non-polling communication process.

With the arrangement of the above-described aspects of the present invention and the preferred embodiments thereof, control of wireless communication modules using wireless communication methods different from each other, in which transmission and reception timing control has conventionally been difficult to perform, is facilitated, which makes it possible to avoid interference between the different wireless communication modules, thereby enhancing communication efficiency. Further, since the mutual interference can be avoided, it is possible to eliminate wasteful retransmission which occurs due to the interference. This contributes not only to reduction of wasteful power consumption, but also to effective use of limited radio wave resources. Furthermore, it is possible to flexibly adjust a communication permission time period allocated in advance to each of the wireless communication modules according to a communication state, so that when traffic of communication in a wireless communication method being used is large, a time period allocated to the corresponding wireless communication module can be extended, which makes it possible to achieve efficient transmission.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

First, a first embodiment of the present invention will be described with reference to FIGS. 1 to 6.

Figure 1:
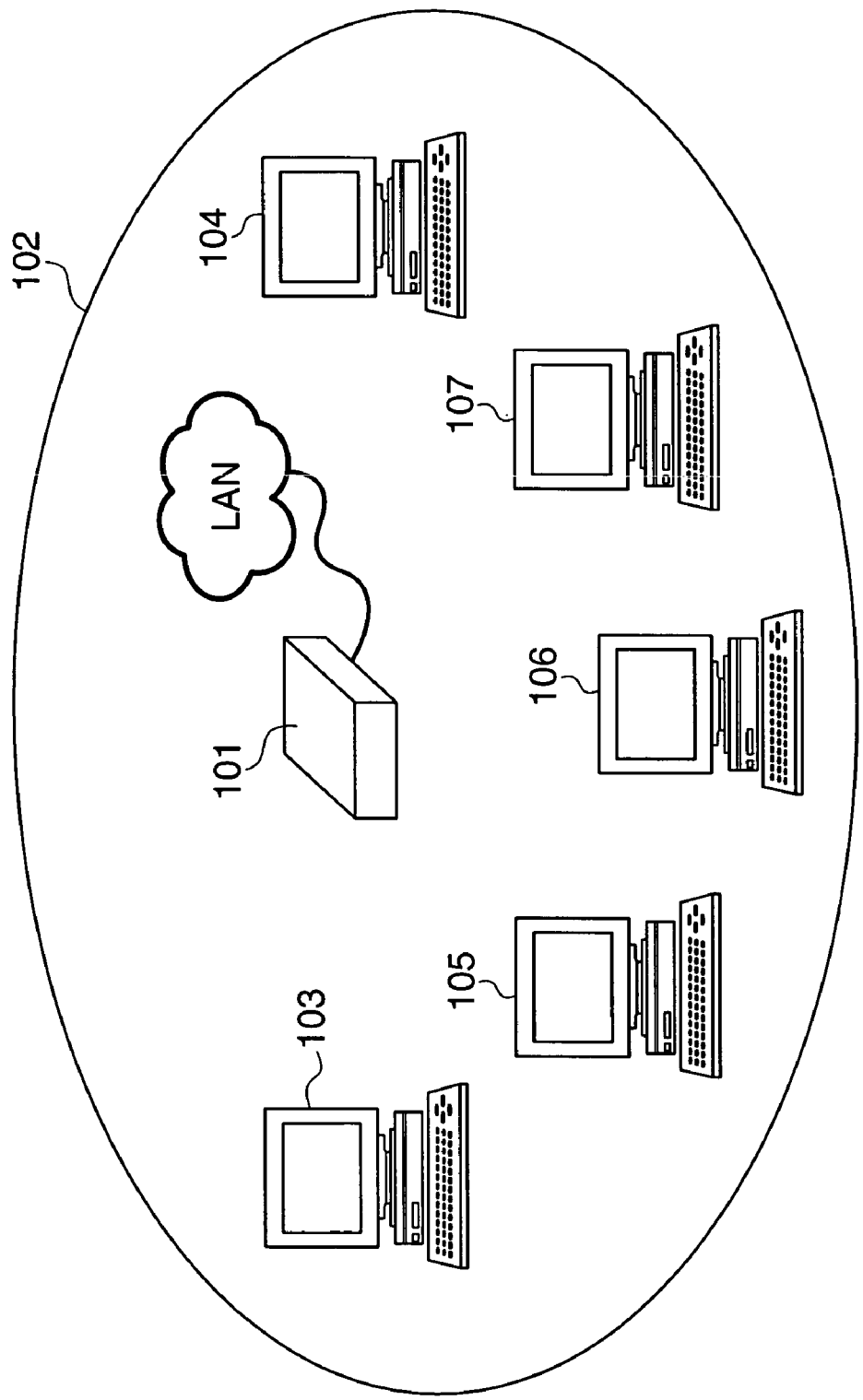
FIG. 1 is a diagram showing the arrangement of a wireless communication system controlled by a control apparatus according to a first embodiment of the present invention.

FIG. 1 is a diagram showing the arrangement of a wireless communication system controlled by a control apparatus according to the first embodiment of the present invention.

In FIG. 1, reference numeral 101 designates a wireless access point having interfaces according to two kinds of wireless communication methods, i.e. a wireless LAN interface and a Bluetooth interface, and reference numeral 102 designates a communicable area for the wireless access point 101. Reference numerals 103 to 107 designate personal computers (each of which will be hereinafter referred to as "the PC") equipped with a wireless interface. The PCs 103 and 104 are provided with a Bluetooth interface, and the PCs 105 to 107 are provided with a wireless LAN interface, for example.

Figure 2:
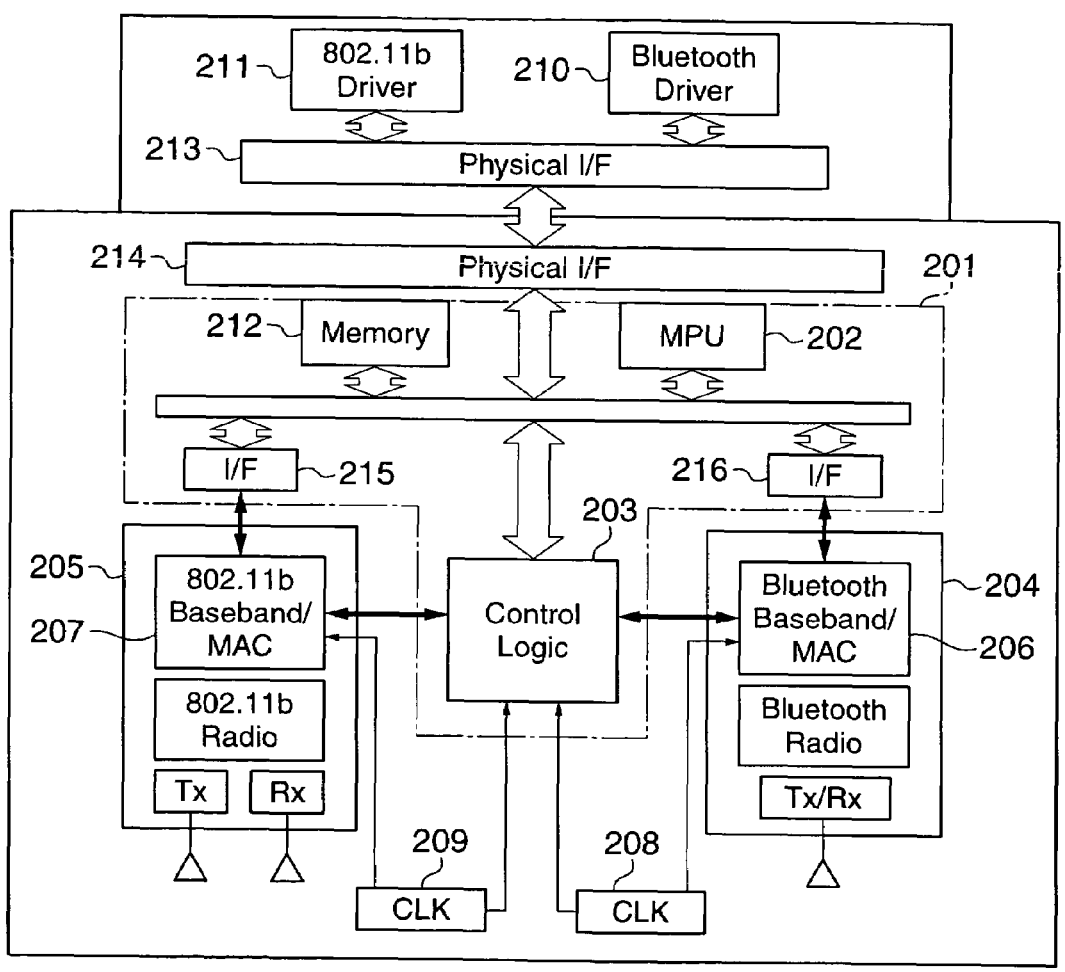
FIG. 2 is a block diagram showing the arrangement of a wireless control system in which a single wireless LAN module and a single Bluetooth module are provided in a wireless access point in FIG. 1.

FIG. 2 is a block diagram showing the arrangement of a wireless communication control system in which a single wireless LAN module and a single Bluetooth module are provided in the wireless access point 101 in FIG. 1.

In FIG. 2, reference numeral 201 designates a control section that controls wireless communicating operations according to the two different wireless communication methods, 202 an MPU (Micro Processing Unit) that controls the control section 201, 203 a control logic section that generates transmission/reception timing control signals for controlling timing of transmission/reception between the two wireless communication systems in the control section 201, 204 a Bluetooth communication section (hereinafter referred to as "the Bluetooth module") as a wireless communication module, 205 a wireless LAN communication section (hereinafter referred to as "the wireless LAN module") as a wireless communication module, 206 a Bluetooth baseband and MAC section (Bluetooth Baseband/MAC) which has a means capable of controlling transmission and reception operations in response to the transmission/reception timing control signals, 207 a wireless LAN baseband and MAC section (802.11b Baseband/MAC) which has a function similar to that of the Bluetooth baseband and MAC section 206, 208 and 209 clock generators (CLK) implemented by crystal oscillators or the like, the one clock generator 208 supplying a system clock to the Bluetooth module 204, while the other clock generator 209 supplying a system clock to the wireless LAN module 205, 210 driver software (Bluetooth Driver) for transmission/reception of data between an access point circuit board having a router function and other functions and the Bluetooth module 204, and 211 driver software (802.11b Driver) for transmission and reception of data between the access point circuit board and the wireless LAN module 205.

In FIG. 2, reference numeral 212 designates a memory, 213 and 214 physical interfaces (Physical I/Fs), and 215 and 216 interfaces (I/Fs).

Figure 3:
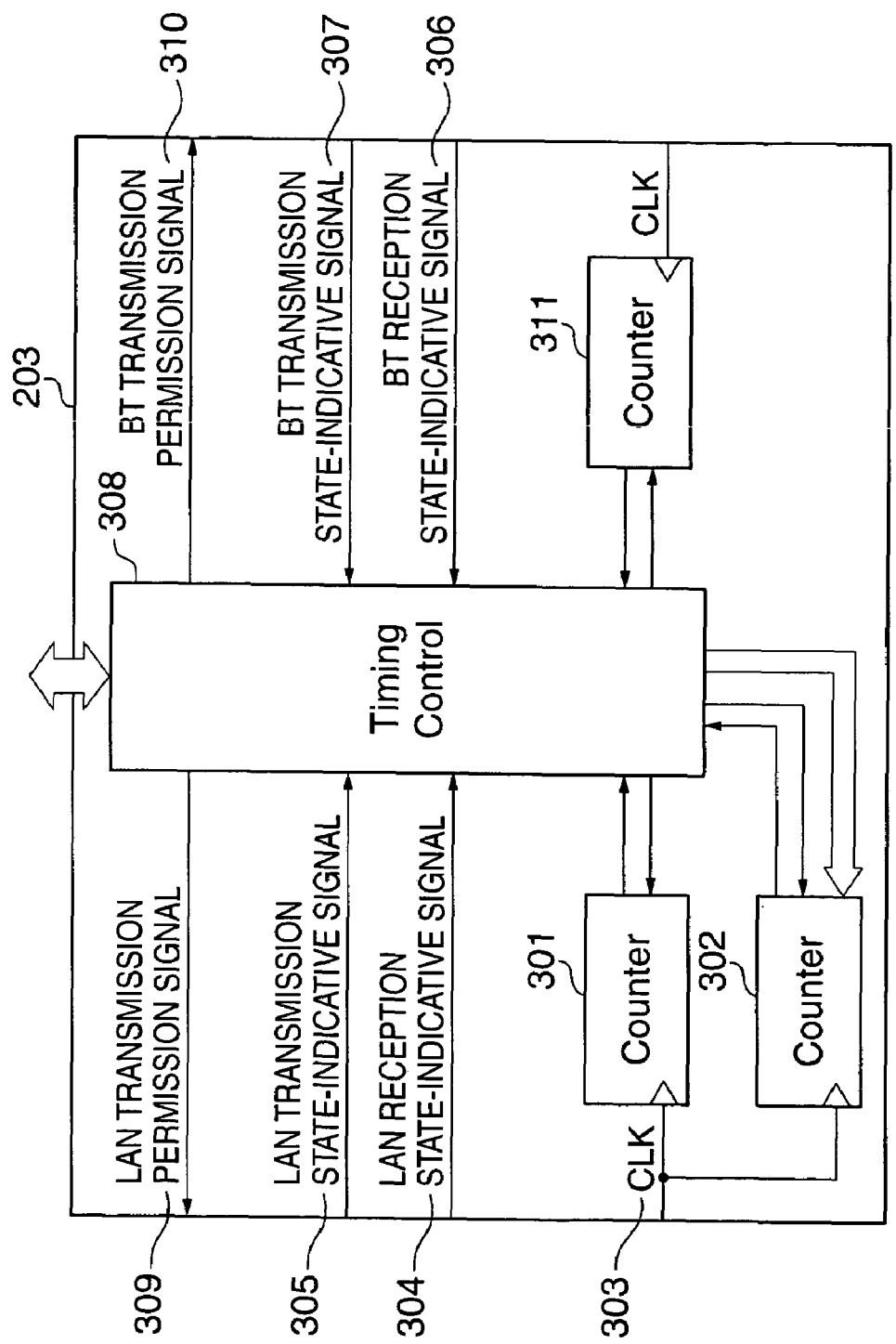
FIG. 3 is a block diagram showing the construction of a control logic section in FIG. 2.

FIG. 3 is a block diagram showing the construction of the control logic section 203 in FIG. 2.

In FIG. 3, reference numeral 301 designates a PIFS time measuring counter (Counter) that detects time-out of a PIFS time period used for determination of an idle state of a medium within a PCF time period of the wireless LAN module 205, 302 a beacon repetition period-measuring counter that measures a beacon repetition period in the wireless LAN module 205, 303 the system clock (CLK) to the wireless LAN module 205, 304 a LAN reception state-indicative signal indicative of a reception state of the wireless LAN module 205, 305 a LAN transmission state-indicative signal indicative of a transmission state of the wireless LAN module 205, 306 a BT reception state-indicative signal indicative of a reception state of the Bluetooth module 204, 307 a BT transmission state-indicative signal indicative of a transmission state of the Bluetooth module 204, 308 a timing signal generation logic (Timing Control) circuit, 309 a LAN transmission permission signal indicative of timing in which the wireless LAN module 205 is permitted to perform transmission, 310 a BT transmission permission signal indicative of timing in which the Bluetooth module 204 is permitted to perform transmission, and 311 a reception slot time measuring counter that detects time-out of a reception slot time period for the Bluetooth module 204.

Figure 4:
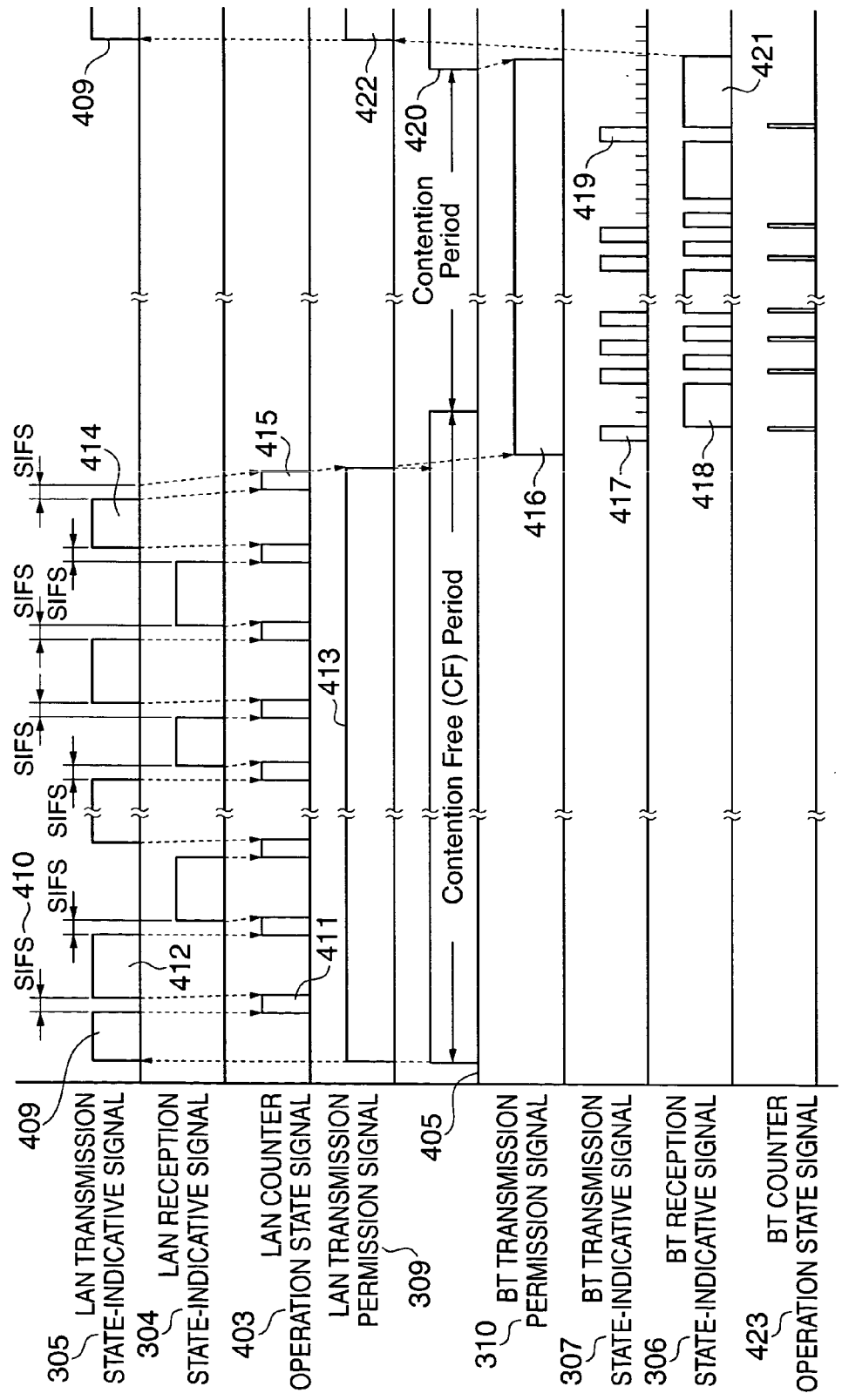
FIG. 4 is a timing chart showing transmission/reception timing of the single wireless LAN module and the single Bluetooth module in the wireless access point in FIG. 1.

FIG. 4 is a timing chart showing timing in which the wireless LAN module and the Bluetooth module in the wireless access point in FIG. 1 perform transmission and reception.

FIG. 4 shows the LAN transmission state-indicative signal 305 outputted from the wireless LAN module 205, the LAN reception state-indicative signal 304 outputted from the same, a signal 403 indicative of measuring operation of the PIFS time measuring counter 301 appearing in FIG. 3, the LAN transmission permission signal 309 which is outputted from the timing signal generation logic circuit 308 appearing in FIG. 3 to the wireless LAN module 205, a cycle 405 of a contention free period and a contention period, the BT transmission permission signal 310 which is outputted from the timing signal generation logic circuit 308 to the Bluetooth module 204, the BT transmission state-indicative signal 307 outputted from the MAC section 206 of the Bluetooth module 204 appearing in FIG. 2, the BT reception state-indicative signal 308 outputted from the MAC section 206 of the Bluetooth module 204, and a signal 423 indicative of measuring operation of the reception slot time measuring counter 311 for the Bluetooth module 204. In these signals, 409 designates a beacon signal-corresponding portion of the LAN transmission state-indicative signal 305 which corresponds to a beacon signal 409' outputted from the wireless LAN module 205, 410 a SIFS time period defined as a response wait time period, 411 a PIFS time period, 412 a frame-corresponding portion of the LAN transmission state-indicative signal other than the beacon signal-corresponding portion and the CF-END signal corresponding portion, 413 and 422 high-level portions of the LAN transmission permission signal, 414 a CF-END signal corresponding portion of the LAN transmission state-indicative signal 305, which corresponds to a CF-END frame generated when polling operation ends before the lapse of the contention free period indicated by the beacon signal 409', 415 a PIFS time period, 416 a high-level portion of the BT transmission permission signal, 417 and 419 transmission-indicative portions of the BT transmission state-indicative signal 307, 418 and 421 reception-indicative portions of the BT reception state-indicative signal 306, and 420 a time corresponding to a timing value counted by the beacon repetition period-measuring counter 302.

Figure 5:
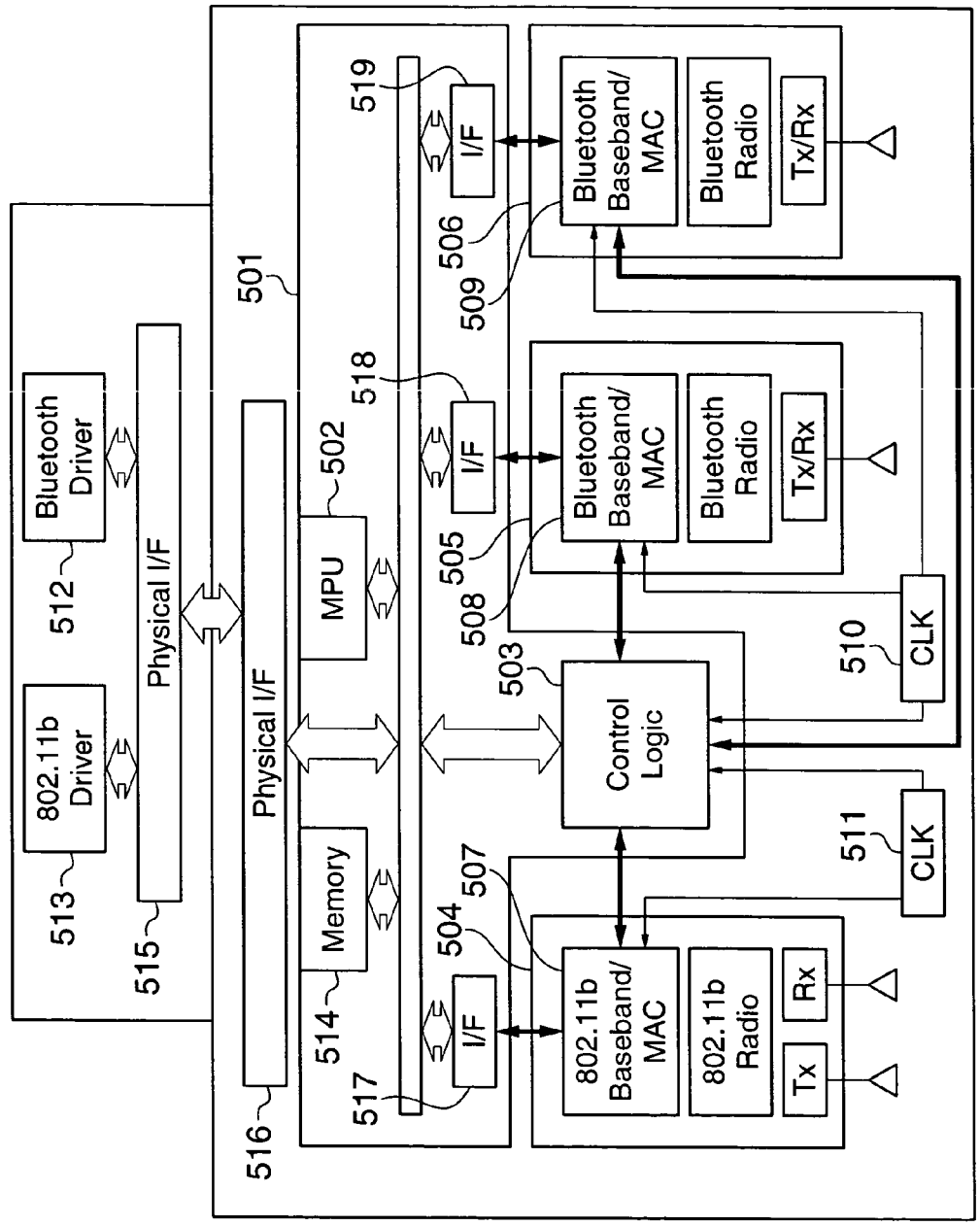
FIG. 5 is a block diagram showing the arrangement of a wireless control system in which a single wireless LAN module and two Bluetooth modules are provided in the wireless access point in FIG. 1.

FIG. 5 is a block diagram showing the arrangement of a wireless communication control system in which one wireless LAN module and two Bluetooth modules are provided in the wireless access point 101 in FIG. 1.

In FIG. 5, reference numeral 501 designates a control section that controls wireless communicating operations according to the two different wireless communication methods, 502 an MPU (Micro Processing Unit) that controls the control section 501, 503 a control logic section that generates transmission/reception timing control signals for controlling timing of transmission/reception between the two wireless communication systems in the control section 501, 504 a wireless LAN communication section (hereinafter referred to as "the wireless LAN module") as a wireless communication module, 505 and 506 Bluetooth communication sections (hereinafter referred to as "the Bluetooth modules") as wireless communication modules, 507 a baseband and MAC section (802.11b Baseband/MAC) of the wireless LAN module 504, which has a means capable of controlling transmission and reception operations in response to the transmission/reception timing control signals, 508 and 509 baseband and MAC sections (Bluetooth Baseband/MACs) of the Bluetooth modules 505 and 506, which have a function similar to that of the baseband and MAC section 507 of the wireless LAN module 504, 510 and 511 clock generators (CLK) implemented by crystal oscillators or the like, the one clock generator 510 supplying a system clock to the Bluetooth modules 505 and 506, while the other clock generator 511 supplying a system clock to the wireless LAN module 504, 512 driver software (Bluetooth Driver) for transmission/reception of data between an access point circuit board having a router and other functions and the Bluetooth modules 505 and 506, and 513 driver software (802.11b Driver) for transmission/reception of data between the access point circuit board and the wireless LAN module 504.

In FIG. 5, reference numeral 514 designates a memory, 515 and 516 physical interfaces (Physical I/Fs), and 517, 518, and 519 interfaces (I/Fs).

Figure 6:
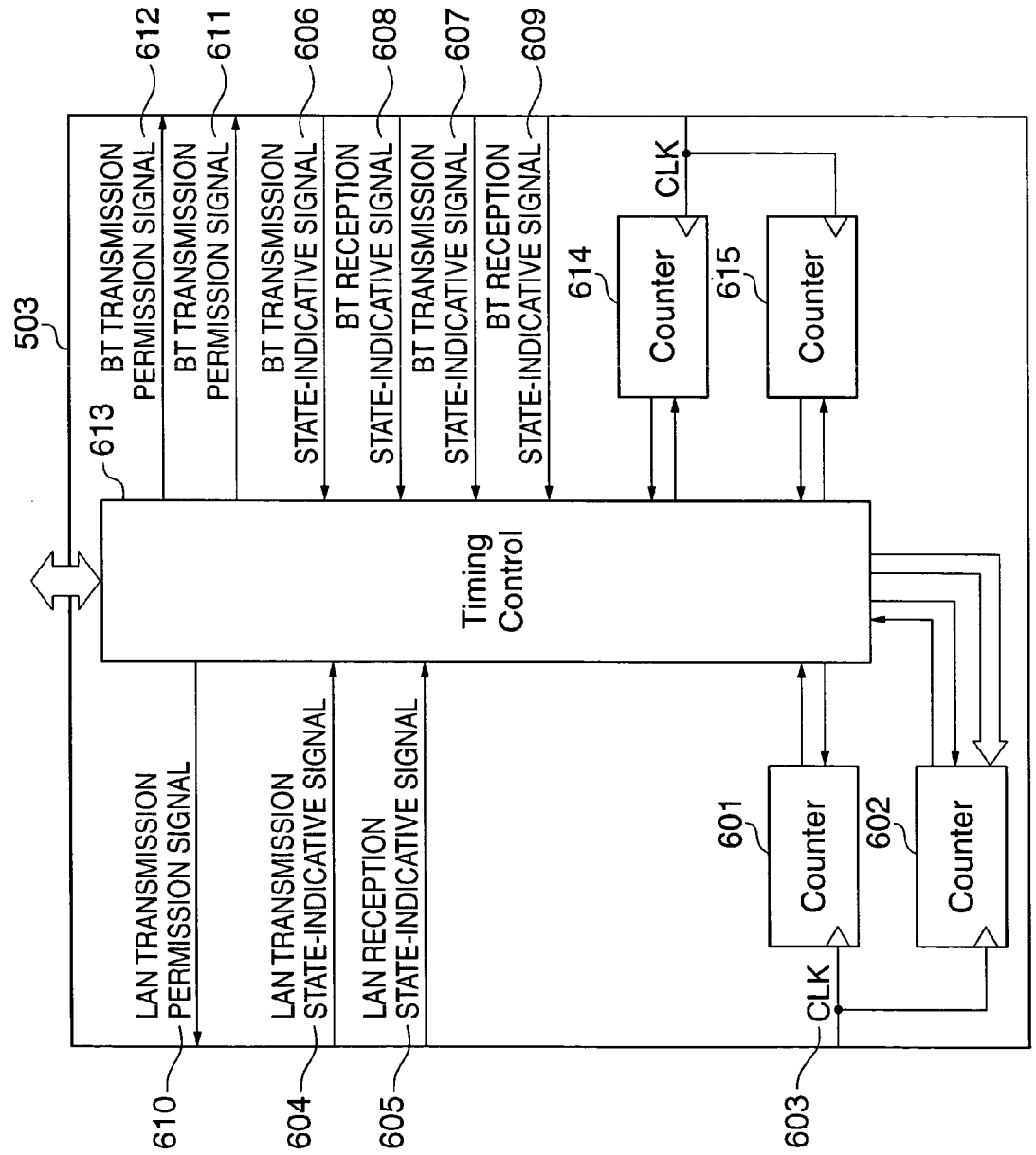
FIG. 6 is a block diagram showing the construction of a control logic section provided in the wireless control system in FIG. 5, which generates transmission/reception timing control signals for the single wireless LAN module and the two Bluetooth modules.

FIG. 6 is a block diagram showing the construction of the control logic section 503 of the wireless access point in, FIG. 1, in the case where the one wireless LAN module and the two Bluetooth modules are provided in the wireless access point.

In FIG. 6, reference numeral 601 designates a SIFS time measuring counter that measures a SIFS time period of the wireless LAN module 504, 602 a beacon repetition period-measuring counter that measures a beacon repetition period in the wireless LAN module 504, 603 the system clock (CLK) supplied to the wireless LAN module 504, 604 a LAN transmission state-indicative signal indicative of a transmission state of the wireless LAN module 504, 605 a reception state-indicative signal indicative of a LAN reception state of the wireless LAN module 504, 606 and 607 BT transmission state-indicative signals indicative of respective transmission states of the two Bluetooth modules 505 and 506, 608 and 609 reception state-indicative signals indicative of respective reception states of the Bluetooth modules 505 and 506, 610 a LAN transmission permission signal indicative of timing in which the wireless LAN module 504 is permitted to perform transmission, 611 and 612 BT transmission permission signals respectively indicative of timing in which the Bluetooth module 505 is permitted to perform transmission and timing in which the Bluetooth module 506 is permitted to perform transmission, 613 a timing signal generating logic (Timing Control) circuit, and 614 and 615 reception slot time measuring counters that detect time-outs of reception slot time periods for the Bluetooth module 505 and 506.

In the following, a detailed description will be given of the operation of the wireless access point 101 in the wireless communication system controlled by the control apparatus according to the present embodiment.

A description will be first given of a timing control operation performed by the wireless access point 101, with reference to FIGS. 2 and 3 showing the basic arrangement of the wireless communication system controlled by the control apparatus according to the present embodiment, in which the single wireless LAN module and the single Bluetooth module are provided in the wireless access point 101.

First, when the wireless access point 101 is turned on, parameter information including a contention free period, a beacon repetition period, a usable frequency channel, and so forth, which are preset in the wireless access point 101 and stored in the memory 212 of the control section 201, is transferred to the MAC section 207 of the wireless LAN module 205 by the MPU 202. The MPU 202 also sets the beacon repetition period and the contention free period for the control logic section 203. The timing signal generation logic circuit 308 of the control logic section 203 having received the set beacon repetition period and the set contention free period generates and delivers transmission permission timing signals respectively indicative of timing in which the wireless LAN module 205 is permitted to perform transmission and timing in which the Bluetooth module 204 is permitted to perform transmission, to the associated modules.

In the wireless LAN module 205, when the transmission permission timing signal 309 permits the wireless LAN module 205 to perform transmission, the MAC section 207 of the module 205 generates a beacon signal containing contention free period information, based on the initially set parameters, and starts to transmit the beacon signal. When a frame including the beacon signal starts to be transmitted from the wireless LAN module 205, the MAC section 207 sets the LAN transmission state-indicative signal 305 supplied to the timing signal generation logic circuit 308 to a high level to indicate the transmission state. If reception from a medium takes place, the MAC section 207 sets the LAN reception state-indicative signal 304 to a high level to indicate the reception state.

On the other hand, in the Bluetooth module 204, after the power is turned on, a signal for initializing the Bluetooth module 204 is transferred from the MPU 202 to the MAC section 206 of the Bluetooth module 204, so as to accept a link connection request signal and an inquiry signal, and the Bluetooth module 204 periodically performs an operation of receiving the inquiry signal and the link connection request signal in timing based on the initially set parameters. If a connection request from the PC 103 (104) equipped with the Bluetooth module 204 is received in the connection request-receiving timing, the Bluetooth module 204 carries out an operation for establishing a physical link. When the physical link to the PC 103 (104) is established, a polling operation from the wireless access point 101 to the PC 103 (104) is started, and subsequently a connection process according to a higher-level protocol is carried out. When the polling operation is started, the Bluetooth module 204 sets the BT transmission state-indicative signal 307 to a high level to indicate the transmission state during transmission performed by the Bluetooth module 204, and sets the BT reception state-indicative signal 306 to a high level to indicate the reception state during reception performed by the same.

The transmission operations according to the above-described two wireless communication methods are carried out only when the respective transmission permission signals 309 and 310 are set to a high level. The two signals 309 and 310 are prevented from being set to a high level simultaneously, i.e. indicating permission of transmission simultaneously.

Next, a description will be given of an operation of generating the transmission permission signals based on the transmission/reception state-indicative signals received from the respective wireless communication modules 204 and 205, with reference to FIGS. 3 and 4.

The timing signal generation logic circuit 308 of the control logic section 203 sets the beacon repetition period-measuring counter 302 to a value set as the beacon repetition period, and sets the PIFS time measuring counter 301 to the PIFS time period, whereafter the timing signal generation logic circuit 308 sets the LAN transmission permission signal 309 to the MAC section 207 of the wireless LAN module 205 to a high level, and actuates the beacon repetition period-measuring counter 302 to start measurement of the beacon repetition period. Responsive to the high-level portion 413 of the LAN transmission permission signal 309, the MAC section 207 of the wireless LAN module 205 transmits a beacon signal 409' to the wireless medium, and at the same time, sets the LAN transmission state-indicative signal 305 to a high level (beacon signal-corresponding portion 409) to indicate the transmission state. This high-level state of the LAN transmission state-indicative signal 305 is held until the transmission of the beacon signal 409' is completed. Then, when the transmission of the beacon signal 409' is completed, the LAN transmission state-indicative signal 305 is turned into a low level. Responsive to the beacon signal-corresponding portion 409 of the LAN transmission state-indicative signal 305, the timing signal generation logic circuit 308 actuates the PIFS time measuring counter 301 to start measurement of the PIFS time period. At this time, if there is any PC linked to the wireless LAN module 205, the MAC section 207 of the wireless LAN module 205 transmits a polling signal (the polling signal mentioned here is intended to mean a signal for giving a PC a license to transmit, but not limited to the polling signal defined by the IEEE 802.11 standard) to the linked PC within the SIFS time period 410, and outputs a frame-corresponding portion 412 of the LAN transmission state-indicative signal 305 in the same manner as above.

Responsive to the frame-corresponding portion 412 of the LAN transmission state-indicative signal 305, the timing signal generation logic circuit 308 causes the PIFS time measuring counter 301 to stop the measuring operation, sets a new PIFS time period, and holds the PIFS time measuring counter 301 on standby for measuring operation until the frame-corresponding portion 412 of the LAN transmission state-indicative signal 305 is turned into a low level. Then, when the transmission of the frame or polling signal is completed to terminate the frame-corresponding portion 412 or set the LAN transmission state-indicative signal 305 to a low level, the timing signal generation logic circuit 308 again actuates the PIFS time measuring counter 301 to measure the PIFS time period, similarly to the above. When the polling signal is transmitted, normally, a response should be received within the SIFS time period. Therefore, after the transmission of the polling signal, if either the LAN transmission state-indicative signal 305 or the LAN reception state-indicative signal 304 is set to a high level to indicate the transmitting operation or receiving operation of the wireless LAN module 205, the timing signal generation logic circuit 308 controls the operation of the PIFS time measuring counter 301 in the same manner as described above. This control operation is repeatedly carried out until the value outputted from the beacon repetition period-measuring counter 302 reaches a predetermined value set as the contention free period, or until the PIFS time measuring counter 301 overflows.

If no more data buffered and polling signal to be transmitted exist before expiration of the contention free period set by the beacon signal (e.g. when predetermined polling to the linked PCs is completed and it is not necessary to carry out polling until a new beacon repetition period starts), the MAC section 207 of the wireless LAN module 205 transmits a CF-END signal indicative of the end of the contention free period. When the CF-END signal is transmitted, the LAN transmission state-indicative signal 305 is set to a high level to start the CF-END signal-corresponding portion 414, and is turned into a low level to terminate the CF-END signal-corresponding portion 414 upon completion of the transmission of the CF-END signal. When termination of the CF-END corresponding portion 414 of the LAN transmission state-indicative signal 305 is detected, the timing signal generation logic circuit 308 actuates the PIFS time measuring counter 301.

Thereafter, since the wireless LAN module 205 has completed communication to be performed within the contention free period, the PIFS time measuring counter is not reset even after the lapse of the PIFS time period 301 to overflow, and a signal indicative of the overflow is outputted to the timing signal generation logic circuit 308. Responsive to this signal, the timing signal generation logic circuit 308 sets the LAN transmission permission signal 309 to the wireless LAN module 205 to a low level to indicate the non-permitting state to interrupt the transmitting operation of the wireless LAN module 205 before the lapse of the currently set contention free time period.

Then, the timing signal generation logic circuit 308 sets the reception slot time measuring counter 311 to a value corresponding to a time period of five time slots defined as a maximum time period in the Bluetooth module 204, and subsequently sets the BT transmission permission signal 310 to the Bluetooth module 204 to a high level (start a high-level portion 416 thereof).

Responsive to the high-level portion 416 of the BT transmission permission signal 310, the MAC section 206 of the Bluetooth module 204 starts to sequentially transmit polling signals (which are intended to mean signals for giving a license to transmit to respective slaves, and include a data packet sent from the master) to PCs starting with the PC 103 for which the link has been established. The MAC section 206 of the Bluetooth module 204 sets the BT transmission state-indicative signal 307 to output a transmission-indicative portion 417 thereof to indicate the transmission state, in the unit of a minimum time slot of hopping, in accordance with timing in which the polling signal is transmitted.

The timing signal generation logic circuit 308 having received the transmission-indicative portion 417 of the BT transmission state-indicative signal 307 starts the reception slot time measuring counter 311 upon termination of the transmission-indicative portion 417 (the BT transmission state-indicative signal 307 is turned into a low level) to indicate the completion of the transmission of the polling signal. When a response signal corresponding to the polling signal is received at this time, the MAC section 206 of the Bluetooth module 204 sets the BT reception state-indicative signal 306 to a high level to output a reception-indicative portion 418 thereof to indicate the reception state. When the reception-indicative portion 418 is detected, the timing signal generation logic circuit 308 presets the reception slot time measuring counter 311, and holds the counter 311 on standby for measuring operation until the BT transmission state-indicative signal 307 is turned from a high level into a low level.

The timing signal generation logic circuit 308 having received the transmission-indicative and reception-indicative portions of the signals 307 and 306 holds the BT transmission permission signal 310 to the Bluetooth module 204 at a high-level as a transmission-permitting level (i.e. maintains the high-level portion 416) until the next count of the beacon repetition period-measuring counter 302 (down-counter) set by the Bluetooth module 204 reaches a timing value obtained by subtracting a maximum value corresponding to the transmission/reception time period defined by the Bluetooth module 204 from a value corresponding to the beacon repetition period (i.e. 635 microseconds×10 (time slots)). Then, when it is detected that the count of the beacon repetition period-measuring counter 302 has reached the timing value (the time 420 is reached), the timing signal generation logic circuit 308 checks the level of the BT reception state-indicative signal 306. If it is found that the signal 306 is at a high level, the timing signal generation logic circuit 308 changes the BT transmission permission signal 310 to the Bluetooth module 204 into a low level (terminates the high-level portion 416) to inhibit the transmission. When the BT transmission permission signal 310 is turned into a low level (the high-level portion 416 is terminated), and the count of the beacon repetition period-measuring counter 302 becomes a value indicative of the start of the next beacon repetition period, the timing signal generation logic circuit 308 outputs the high-level portion 422 of the LAN transmission permission signal 309 to the MAC section 207 of the wireless LAN module 205 to thereby restart transmission by the wireless LAN module 205.

If a response signal (which is detected by the reception-indicative portion 421 of the BT reception state-indicative signal 306) to a polling signal transmitted from the Bluetooth module 204 (detected by the transmission-indicative portion 419 of the BT transmission state-indicative signal 307) has not been received within a time period over which the beacon repetition period-measuring counter 302 should count the time period corresponding to the ten slots, so that the reception slot time measuring counter 311 has overflowed, the BT transmission permission signal 310 is held at a high level (the high-level portion 416 is continued) by the timing signal generation logic circuit 308 so as to extend a transmission time period for re-transmission of a polling signal from the Bluetooth module 204.

The Bluetooth module 204 given the license to transmit by the high-level portion 416 of the BT transmission permission signal 310 re-transmits a packet to the PC from which no response to the transmission of the preceding packet or polling signal has been received, and sets the BT transmission-indicative signal 307 to a high level in the same manner as described above. When detecting the high-level portion of the BT transmission-indicative signal 307, the timing signal generation logic circuit 308 continues to monitor the BT reception state-indicative signal 306. When it is detected that the signal 306 is at a high level, the timing signal generation logic circuit 308 sets the BT transmission permission signal 310 to the Bluetooth module 204 to a low level, and postpones the output of a high-level portion of the LAN transmission permission timing signal 309 to the wireless LAN module 205 until the BT reception state-indicative signal 306 is turned into a low level. Then, when the BT reception state-indicative signal 306 is turned into a low level, and response reception is completed, the LAN transmission permission signal 309 to the wireless LAN module 205 is set to a high level.

The time period used for the re-transmission process by the Bluetooth module 204 is stored as an offset value within the timing signal generation logic circuit 308. This offset value is subtracted from a count value given by the beacon repetition period-measuring counter 302, whereby the contention free period for the wireless LAN module 205 is secured. This delay time period is updated for each beacon repetition period. If the transmission permission time period for the Bluetooth module 204 ends earlier than the start of the next beacon repetition period, the offset value is reset to zero.

Next, the operation of the access point with a plurality of Bluetooth modules provided therein will be described with reference to FIGS. 5 and 6.

First, when the wireless access point 101 is turned on, initial parameters for the wireless LAN module 504 and the Bluetooth modules 505 and 506, which are stored in the access point circuit board, are transferred to the MPU 502 via the respective drivers 512 and 513 in the same manner as described above with reference to FIG. 2. When receiving the parameters, the MPU 502 initializes the wireless LAN module 504 and the Bluetooth modules 505 and 506 provided in the wireless access point 101, and also initializes the control logic section 503. The control logic section 503 thus set up sets the beacon repetition period-measuring counter 602 to a preset value of the beacon repetition period, and then starts the counter 602. At the same time, the control logic section 503 sets the LAN transmission permission signal to the wireless LAN 504 to a high level to output a high-level portion of the LAN transmission permission signal 610.

When detecting the high-level portion of the LAN transmission permission signal 610, the MAC section 507 of the wireless LAN 504 transmits a beacon signal 409' in the same manner as described hereinbefore, and then starts polling control if there is any linked PC. This polling control is continuously executed over a time period when transmission is permitted by the transmission permission signal, i.e. over a time period set as the contention free period, or until the contention free period is ended by a CF-END signal after determination that there is no data to be transmitted within the period, and when the time period has elapsed, the LAN transmission permission signal 610 changes to a low level to inhibit the transmission, and the communicating operation by the wireless LAN 504 is temporarily stopped.

When the time period for communication by the wireless LAN 504 ends, the timing signal generation logic circuit 613 of the control logic section 503 sets the BT transmission permission signals 611 and 612 to the Bluetooth modules 505 and 506 to a high level. When detecting the high-level portions of these signals 611 and 612, the Bluetooth modules 505 and 506 transmit polling signals to the linked PCs, and at the same output respective transmission-indicative portions (high-level portions) of the BT transmission state-indicative signals 606 and 607. In this case, the Bluetooth modules 505 and 506 perform communications independently of each other, and therefore, if the Bluetooth module 505 has performed transmission using a packet type DH1, and the other Bluetooth module 506 has performed transmission using a packet type DM5, the Bluetooth module 505 having performed transmission using the packet type DH1 sets and holds the BT transmission state-indicative signal 606 to a high level over a time period of one time slot (625 microseconds), while the other Bluetooth module 506 having performed transmission using the packet type DM5 sets and holds the BT transmission state-indicative signal 607 to a high level over a time period of five time slots (3.125 milliseconds). Similarly, the BT reception state-indicative signals 608 and 609 from the respective Bluetooth modules 505 and 506 are set and held to a high level over different time periods corresponding to respective reception time slots.

The BT transmission permission signals 611 and 612 outputted from the timing signal generation logic circuit 613 to the respective Bluetooth modules 505 and 506 are held at a high level as the transmission-permitting level, similarly to the example described hereinbefore with reference to FIG. 2, until the count of the beacon repetition period-measuring counter 602 (down-counter) reaches a value obtained by subtracting a maximum value corresponding to the transmission/reception time period defined by the Bluetooth modules 505 and 506 from a value corresponding to the beacon repetition period. Then, when it is detected that the count of the beacon repetition period-measuring counter 602 has reached the above-mentioned value, the timing signal generation logic circuit 613 checks the levels of the BT reception state-indicative signals 608 and 609 outputted from respective MAC sections 508 and 509 of the Bluetooth modules 505 and 506, as in the above-described example, and if any module outputs a high-level portion of the BT reception state-indicative signal, changes the corresponding BT transmission permission signal to the module into a low level as a transmission-inhibiting level. Assuming that the Bluetooth module 506 is currently receiving a response, and the Bluetooth module 505 is currently performing transmission, only the BT transmission permission signal 611 to the Bluetooth module 506 is turned into a low level, whereas the transmission permission signal 612 to the Bluetooth module 505 is held at a high level until the reception state-indicative signal 609 indicates a high level.

In this case, if the BT reception state-indicative signal 609 from the Bluetooth module 506 does not indicate the high level even after the beacon signal starts to be transmitted, the BT transmission permission time period is extended, as in the above example, and the extended time period is stored as a beacon start delay offset value to be used for securing a contention free period for the wireless LAN module 504.

As described above, the control apparatus for the wireless communication system, according to the present embodiment, makes it possible to easily control the different types of wireless communication modules which has been conventionally difficult to control in respect of transmission/reception timing, and therefore makes it possible to prevent interference therebetween, thereby enhancing communication efficiency. Further, since the mutual interference can be prevented, it is possible to eliminate wasteful re-transmission which occurs due to the interference. This contributes not only to reduction of wasteful power consumption, but also to effective use of limited radio wave resources. Furthermore, it is possible to flexibly adjust a communication permission time period allocated in advance to each of the wireless communication modules according to communication states, so that when traffic by a currently used wireless communication method is large, the allocated time period can be extended, which makes it possible to achieve efficient transmission.

Moreover, since timing control of a plurality of modules of the two kinds of wireless communication systems can be executed by a common control circuit, apparatuses or devices that perform communication by the respective wireless communication methods are allowed to perform transmission simultaneously in such a manner that traffic can be decentralized, which makes it possible to provide a comfortable or stress-free communication environment to users connected to the LAN via an access point.

Further, the access point is provided with an output means for causing a wireless LAN module to output a LAN reception state-indicative signal when a specific frame, such as a probe request frame, is received and output a LAN transmission permission signal to the wireless LAN module when the LAN reception state-indicative signal (high-level portion thereof) is detected. This makes it possible to transmit a response from the access point even in a time period other than an allocated communication permission time period. Therefore, even when the two communication systems coexist, degradation of responsiveness can be suppressed.

Further, an output means is provided for outputting a signal indicative of a contention free period, during which a wireless LAN module performs transmission, to a transmission timing control circuit so that control for allocation of a transmission permission time period can be executed based on the signal. As a result, the circuit scale of the transmission timing control circuit can be reduced, which makes it possible to reduce the number of component costs and power consumption.

Furthermore, a control signal input means is provided for causing a wireless LAN module to control the timing of starting beacon generation, so that even when a plurality of wireless LAN modules are provided in the control apparatus, synchronization between the wireless LAN modules can be easily obtained, which makes it possible to achieve more accurate transmission timing control.

Although in the present embodiment, the timing of switching between the transmission permission signals of the wireless LAN module 504 and the Bluetooth module 505 (506) is performed using a fixed value by the control logic section 503, time information used for this switching timing can be dynamically set by the MPU 502. This control by the MPU 502 makes it possible to change the beacon repetition period and the contention free period (the time period allocated for communication by the wireless LAN module) to optimum values according to the number of wireless LAN modules and that of Bluetooth modules connected to the wireless access point 101.

In the present embodiment, the communication period of a wireless LAN module and that of a Bluetooth module are separated from each other or do not overlap based on the contention free period and the contention period defined for the wireless LAN module 504. However, unless transmissions are performed by the two modules simultaneously when both of the modules perform receptions, the interference can be eliminated, provided that the two modules do not perform communications using the same frequency. Therefore, by using the reception state-indicative signals for the two modules, it is also possible to inhibit the modules from performing transmissions only when the modules perform reception.

Further, by also employing for this control an adaptive hopping method in which a frequency band used within a communication frequency band by the Bluetooth module is detected in advance, and a frequency band used by the wireless LAN module is omitted from the frequency hopping pattern it is possible to more effectively eliminate interference when reception operations according to the two wireless communication methods are carried out simultaneously.

Further, when the adaptive hopping is performed, since the control apparatus according to the present embodiment includes the MPU 502 that controls the modules 504 to 506 of the two different wireless communication systems, a frequency channel information input means may be provided for inputting frequency channel information to be used by the wireless LAN module 504 to the Bluetooth modules 505 and 506, and the MPU 502 uses this frequency channel information input means to input frequency channel information to be used when the MPU 502 performs initialization or when the wireless LAN module 504 is started, and finally determine the adaptive hopping frequency based on the input information, whereby it is possible to avoid interference with higher reliability.

Although in the present embodiment, the system clocks 510 and 511 used by the wireless LAN module 504 and the Bluetooth modules 505 and 506 are implemented by a common clock, and the clocks of the counters 602, 603, 614, and 615 within the control logic section 503 are implemented by a common clock, to thereby enhance accuracy in time measurements, all these clocks may be implemented by a common clock to provide the same advantageous effect, and contribute to reduction of component costs.

Further, although in the present embodiment, the beacon repetition period and contention free period of the wireless LAN module 504 are measured by the counters to generate the transmission permission signals, an output means may be provided for outputting information of the beacon repetition period and/or the contention free period from the wireless LAN module 504, to generate the transmission permission signals based on the information outputted from the output means.

Next, a second embodiment of the present invention will be described with reference to FIGS. 7 to 10.

Although in the above described first embodiment, the access point is provided with the single wireless LAN module 504 and the two Bluetooth modules 505 and 506, this is not limitative, but a plurality of wireless LAN modules may be provided in the access point.

In the following, a description will be given of a case where a plurality of wireless LAN modules and a plurality of Bluetooth modules are provided in a wireless access point as the control apparatus according to the second embodiment of the present invention.

Figure 7:
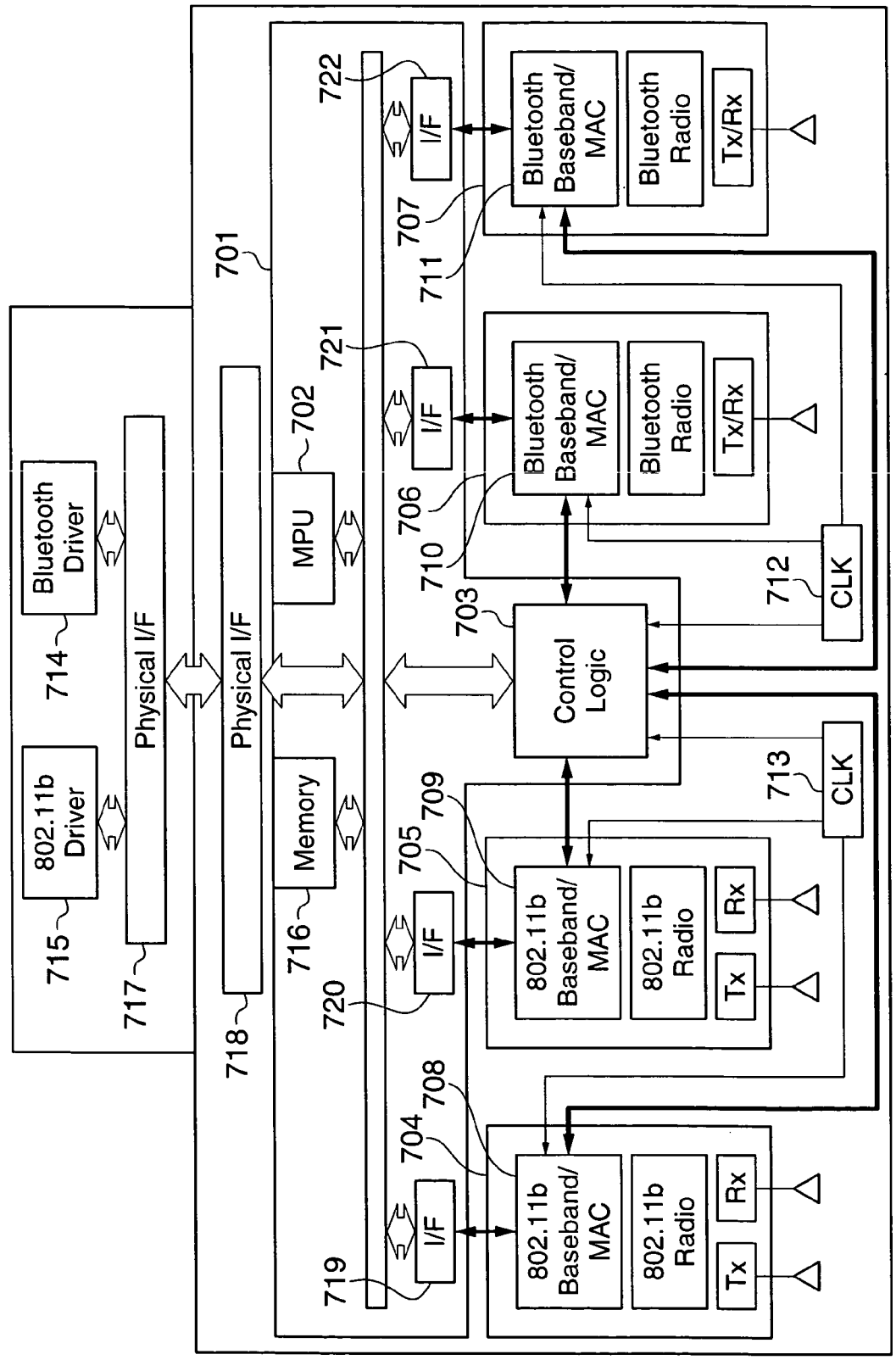
FIG. 7 is a block diagram showing the arrangement of a wireless control system in which two wireless LAN modules and two Bluetooth modules are provided in a wireless access point as a control apparatus according to a second embodiment of the present invention.

FIG. 7 is a block diagram showing the arrangement of a wireless control system in which two wireless LAN modules and two Bluetooth modules are provided in a wireless access point as the control apparatus according to the second embodiment.

In FIG. 7, reference numeral 701 designates a control section that controls wireless communicating operations according to the two different wireless communication methods, 702 an MPU (Micro Processing Unit) that controls the control section 701, 703 a control logic section that generates transmission/reception timing control signals for controlling timing of transmission and reception operations performed by the modules according to the two wireless communication methods of the control section 701, 704 and 705 wireless LAN communication sections (hereinafter referred to as "the wireless LAN modules") as wireless communication modules, 706 and 707 Bluetooth communication sections (hereinafter referred to as "the Bluetooth modules") as wireless communication modules, 708 and 709 baseband and MAC sections (802.11b Baseband/MACs) of the wireless LAN modules 704 and 705, which have a means capable of controlling transmission and reception operations in response to the transmission/reception timing control signals, 710 and 711 baseband and MAC sections (Bluetooth Baseband/MACs) of the Bluetooth modules 704 and 707, which have respective functions identical to those of the baseband and MAC sections 708 and 709 of the wireless LAN modules 704 and 705, 712 and 713 clock generators (CLK) implemented by crystal oscillators or the like, the one clock generator 712 supplying a system clock to the Bluetooth modules 706 and 707, while the other clock generator 713 supplying a system clock to the wireless LAN modules 704 and 705, 714 driver software (Bluetooth Driver) for transmission/reception of data between an access point circuit board having a router function and the like and the Bluetooth modules 706 and 707, and 715 driver software (802.11b Driver) for transmission/reception of data between the access point circuit board and the wireless LAN modules 704 and 705.

In FIG. 7, reference numeral 716 designates a memory, 717 and 718 physical interfaces (Physical I/Fs), and 719, 720, 721, and 722 interfaces (I/Fs).

Figure 8:
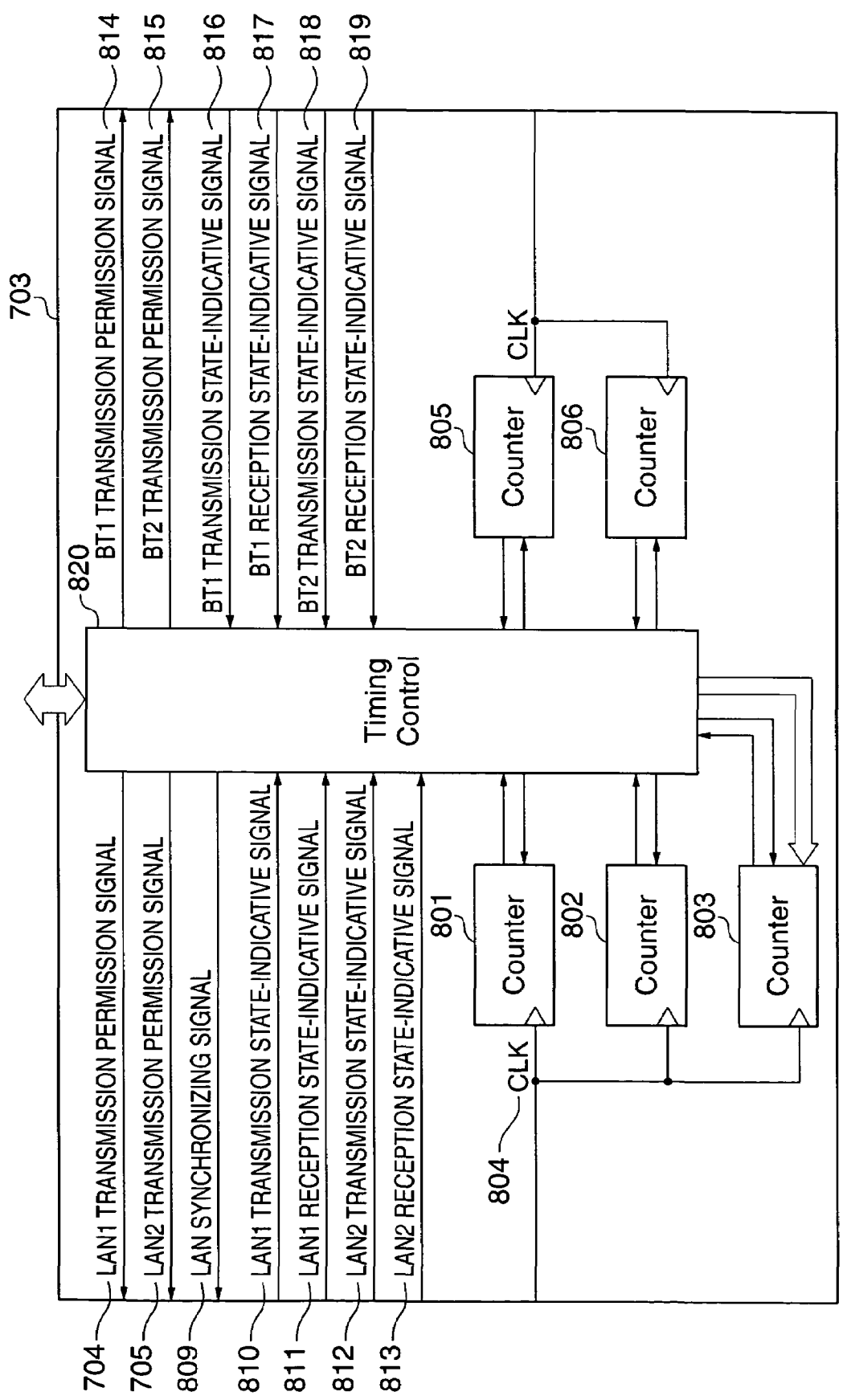
FIG. 8 is a block diagram showing the construction of a control logic section in FIG. 7.

FIG. 8 is a block diagram showing the construction of the control logic section 703 of the wireless access point in FIG. 7.

In FIG. 8, reference numerals 801 and 802 designate PIFS time measuring counters (LAN 1 and LAN2 counters) that detect respective time-outs of the PIFS time periods of the wireless LAN modules 704 and 705 for use in determining if the medium is idle within PCF time periods thereof, 803 a beacon repetition period-measuring counter that measures the beacon repetition period of the wireless LAN modules 704 and 705, 804 a system clock (CLK) supplied to the wireless LAN modules 704 and 705, 805 and 806 reception slot time counters (BT1 and BT2 counters) that detect time-outs of reception slot times of the Bluetooth modules 706 and 707, 807 and 808 a LAN1 transmission permission signal and a LAN2 transmission permission signal for allowing the wireless LAN modules 704 and 705 to perform transmission, 809 a LAN synchronizing signal that synchronizes the operations of the wireless LAN modules 704 and 705, 810 and 812 a LAN1 transmission state-indicative signal and a LAN2 transmission state-indicative signal indicative of transmission states of the wireless LAN modules 704 and 705, 811 and 813 a LAN1 reception state-indicative signal and a LAN2 reception state-indicative signal indicative of reception states of the wireless LAN modules 704 and 705, 814 and 815 a BT1 transmission permission signal and a BT2 transmission permission signal for allowing the wireless Bluetooth modules 706 and 707 to perform transmission, 816 and 818 a BT1 transmission state-indicative signal and a BT2 transmission state-indicative signal indicative of transmission states of the Bluetooth modules 706 and 707, 817 and 819 a BT1 reception state-indicative signal and a BT2 reception state-indicative signal indicative of reception states of the Bluetooth modules 706 and 707, and 820 a timing signal generating logic (Timing Control) circuit.

Figure 9:
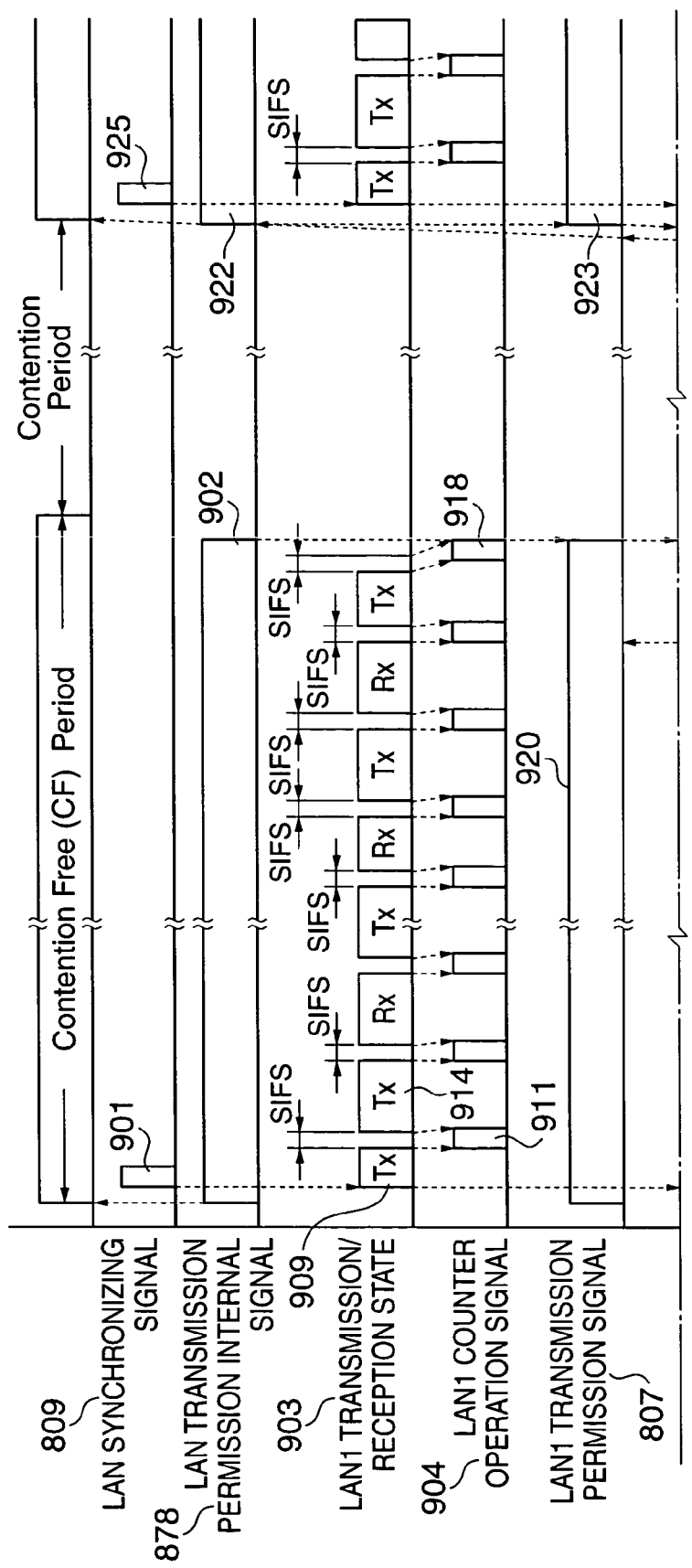
FIG. 9 is a timing chart showing transmission/reception timing of the two wireless LAN modules and the two Bluetooth modules in the wireless access point in FIG. 7.
Figure 10:
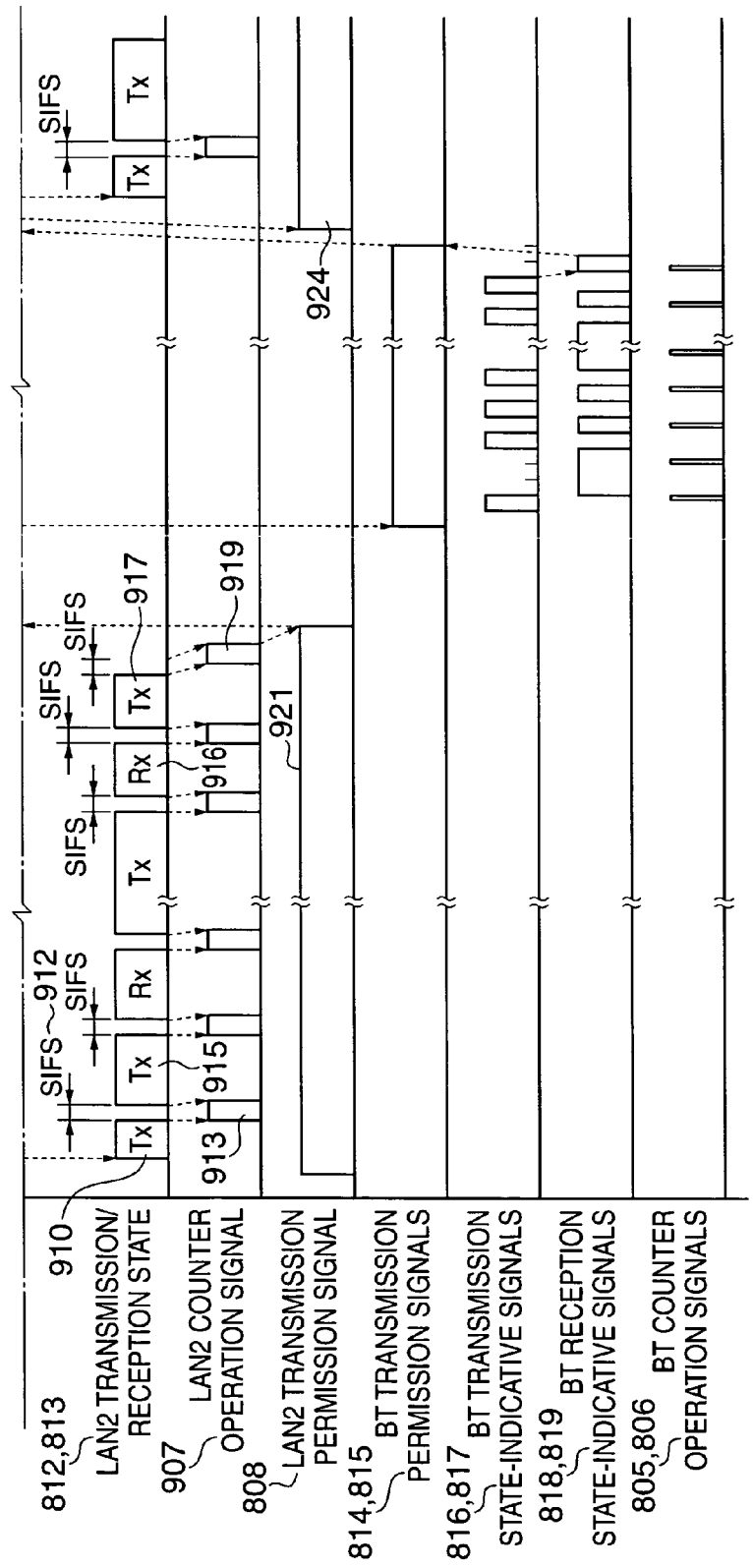
FIG. 10 is another timing chart showing transmission/reception timing of the two wireless LAN modules and the two Bluetooth modules in the wireless access point in FIG. 7.
Figure 11:
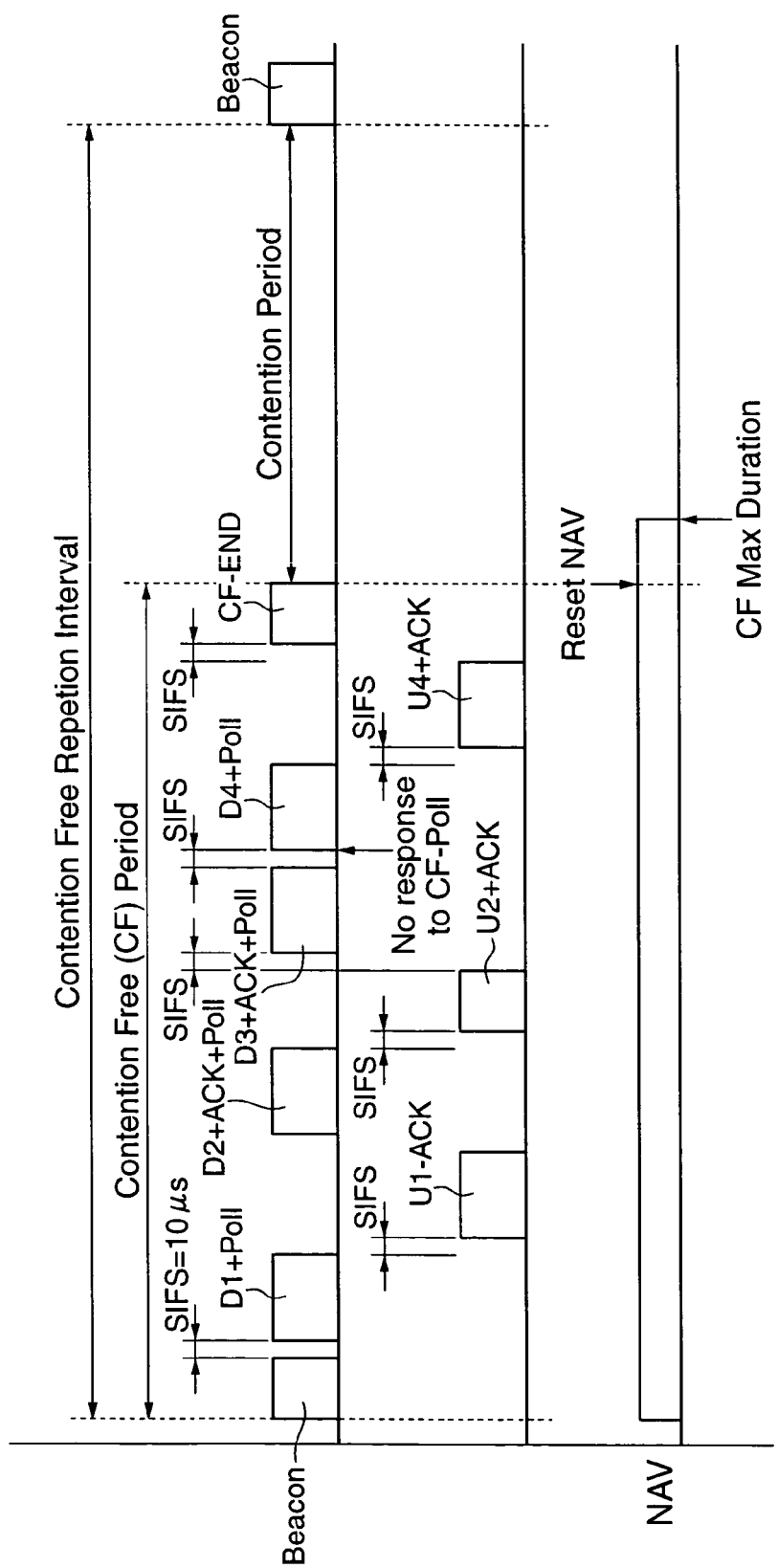
FIG. 11 is a diagram useful in explaining problems with the prior art.
Figure 12:
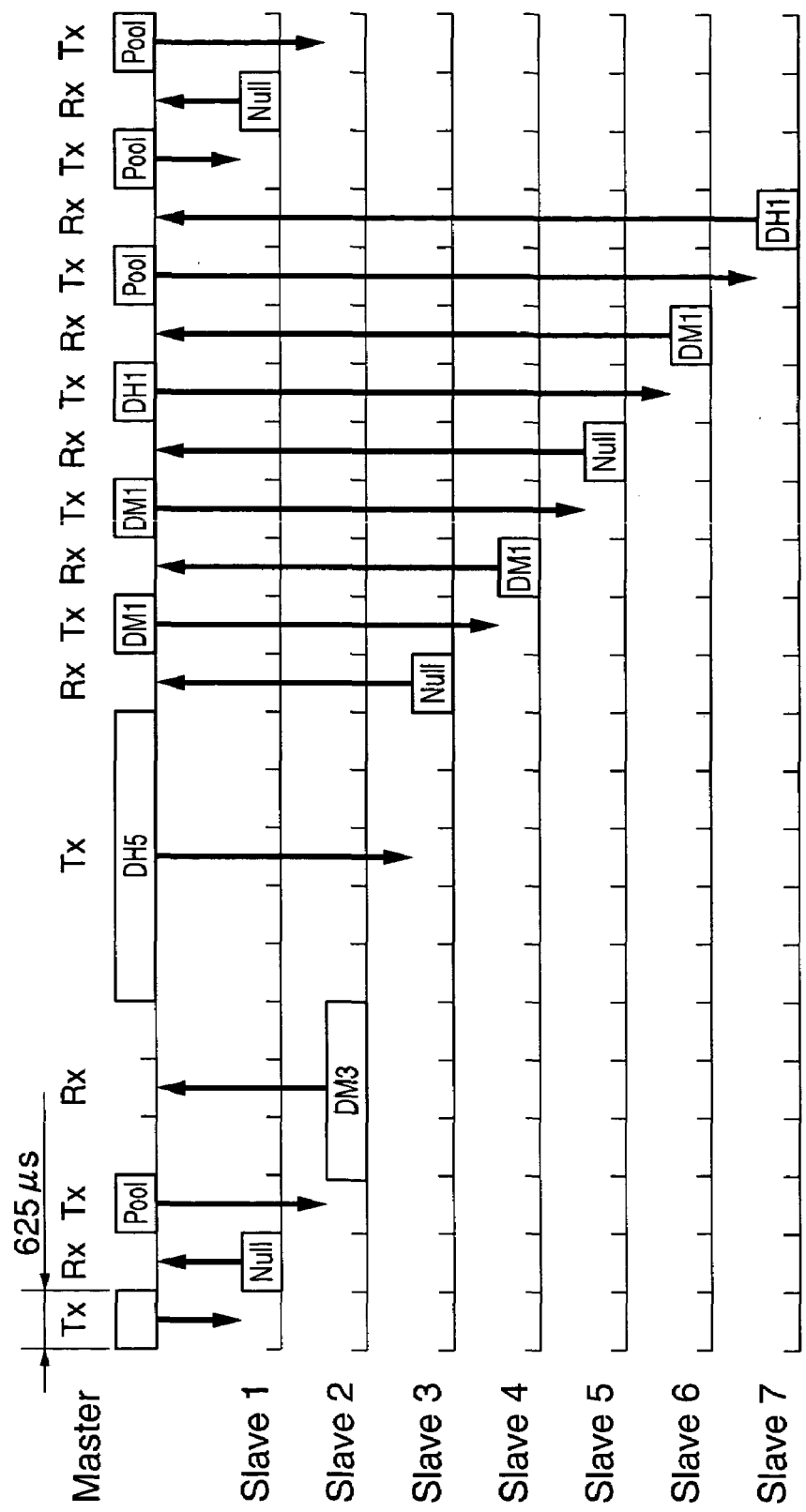
FIG. 12 is another diagram useful in explaining problems with the prior art.

FIGS. 9 and 10 are timing charts showing timing in which the wireless LAN modules and the Bluetooth modules of the wireless access point in FIG. 7 perform transmission and reception operations.

FIG. 9 shows the LAN synchronizing signal 809 for synchronizing the respective beacon repetition periods of the wireless LAN modules 704 and 705, a LAN transmission permission internal signal 878 for setting timing of switching the LAN1 and LAN2 transmission permission signals 807 and 808 for the respective wireless LAN modules 704 and 705, and for assuming a value equivalent to a contention free period initially set to the control apparatus, a LAN1 transmission/reception state 903 showing high-level portions (Tx) of the LAN1 transmission state-indicative signal 810 and high-level portions (Rx) of the LAN1 reception state-indicative signal 811 outputted from the wireless LAN module 704, a LAN1 counter operation signal 904 indicative of a measurement operation of the PIFS time measuring counter (LAN1 counter) 801 associated with the wireless LAN module 704, and the LAN1 transmission permission signal 807 outputted from the timing signal generation logic circuit 820 to the wireless LAN module 704. FIG. 10 shows a LAN2 transmission/reception state 906 showing high-level portions (Tx) of the LAN2 transmission state-indicative signal 812 and high-level portions (Rx) of the LAN2 reception state-indicative signal 813 outputted from the wireless LAN module 705, a LAN2 counter operation signal 907 indicative of a measurement operation of the PIFS time measuring counter (LAN2 counter) 802 associated with the wireless LAN module 705, the LAN 2 transmission permission signal 808 outputted from the timing signal generation logic circuit 820 to the wireless LAN module 705, the BT transmission permission signals 814 & 815, the BT transmission state-indicative signals 816 & 817, the BT reception state-indicative signals 818 & 819, and BT counter operation signals 805' & 806' indicative of respective measuring operations of the BT counters 805 and 806. As is understood from the illustration, each pair of the BT1 transmission permission signals 814 and the BT2 transmission permission signal 815, the BT1 transmission state-indicative signal 816 and the BT1 transmission state-indicative signal 817, the BT1 reception state-indicative signal 818 and the BT2 reception state-indicative signal 819, and the BT1 counter operation signal 805' and the BT2 counter operation signal 806' change in the same timing. In FIGS. 9 and 10, reference numerals 901 and 925 designate pulses of the LAN synchronizing signal 809, 902 and 922 high-level portions of the LAN transmission permission internal signal 878. Reference numeral 909 in the LAN1 transmission/reception state 903 and reference numeral 910 in the LAN 2 transmission/reception state 906 designate high-level portions corresponding to respective beacon signals outputted from the wireless LAN modules, 911 and 913 SIFS time periods, 912 a SIFS time period defined as a response wait time, 914 and 915 high-level portions corresponding to respective polling signals, 916 a signal received from a PC permitted by the polling signal to perform transmission, 917 a high-level portion corresponding to a CF-END signal generated when a polling operation ends before the lapse of the contention free period indicated by the beacon signal 910, and 918 a signal portion indicative of overflow of the count of the PIFS time measuring counter (LAN1 counter) 801. Reference numeral 919 designates a signal portion indicative of overflow of the count of the LAN2 counter 802, and 920 to 924 high-level portions of the LAN1 and LAN2 transmission permission signals.

In the following, a detailed description will be given of operations performed in the case where the two wireless LAN modules and the two Bluetooth modules are provided in the wireless access point 101.

First, when the wireless access point 101 is turned on, initial parameters for the wireless LAN modules 704 and 705 and the Bluetooth modules 706 and 707, which are stored in the access point circuit board, are transferred to the MPU 702 via the respective drivers 715 and 716 in the same manner as described above as to the first embodiment. When receiving the parameters, the MPU 702 initializes the wireless LAN modules 704 and 705 and the Bluetooth modules 706 and 707 provided in the wireless access point 101, and also initializes the control logic section 703. The control logic section 703 thus set up sets the beacon repetition period-measuring counter 803 to a preset value of the beacon repetition period, and the PIFS time period to the PIFS time measuring counters (LAN1 and LAN2 counters) 801 and 802, and then starts the beacon repetition period-measuring counter 803. Further, the control logic section 703 outputs a pulse 901 of the LAN synchronizing (beacon synchronizing) signal 809 and the LAN1 and LAN2 transmission permission signals 807 and 808 to the wireless LAN modules 704 and 705.

When receiving the pulse 901 of the LAN synchronizing signal 809, the wireless LAN modules 704 and 705 reset respective internal beacon timing generation counters (not shown), and then start transmission of the respective beacon signals 909 and 910. When the transmission of the beacon signals 909 and 910 is completed, and each of the transmission state-indicative signals 810 and 812 goes low, the timing signal generation logic circuit 820 starts the PIFS time measuring (LAN1 and LAN2) counters 801 and 802 to measure the PIFS time periods 911 and 913 in the same manner as described above with respect to the first embodiment.

While the PIFS time measuring (LAN1 and LAN2) counters 801 and 802 are measuring the PIFS time periods 911 and 913, the polling signals 914 and 915 are transmitted to PCs linked to the wireless access point 101 via the respective wireless LAN modules 704 and 705. When the transmission state-indicative signals 810 and 812 go high, the timing signal generation logic circuit 820 presets the PIFS time measuring (LAN1 and LAN2) counters 801 and 802 assigned to the wireless LAN modules 704 and 705, independently of each other. Then, the measurement operations of the PIFS time measuring (LAN1 and LAN2) counters 801 and 802 are held in stoppage until the transmission state-indicative signals 810 and 812 go low. When the polling signals 914 and 915 are transmitted, normally, responses should be received within the SIFS time period. Therefore, after the transmission of the polling signals 914 and 915, whenever each of the LAN transmission state-indicative signals 810 and 812 and the LAN reception state-indicative signals 811 and 813 goes high to indicate a transmitting or receiving operation of the associated one of the wireless LAN modules 704 and 705, the timing signal generation logic circuit 820 controls the operations of the PIFS time measuring (LAN1 and LAN2) counters 801 and 802 in the same manner as described above.

Now, upon completion of reception of the final data to be received, which is indicated by the high-level portion 916 of the LAN2 transmission/reception state, by the wireless LAN module 705 within a contention free period set in each beacon repetition period, the MAC section 709 of the wireless LAN module 705 transmits the CF-END signal, which is indicated by the high-level portion 917 of the LAN2 transmission/reception state 906, to terminate the polling operation. When the polling operation is terminated, the PIFS time measuring counter (LAN2 counter) 802 controlled by the timing signal generation logic circuit 820 overflows. When detecting the signal portion 919 indicative of this overflow, the timing signal generation logic circuit 820 terminates the high-level portion 921 of the LAN2 transmission permission signal 808 by setting the wireless LAN module 705 to the wireless LAN module 705 to a low level, to temporarily stop the communicating operation of the wireless LAN module 705, and then checks the communicating operation of the other wireless LAN module 704. If the other wireless LAN module 704 is still performing data communication as shown by the LAN1 transmission/reception state 903 at this time point, the timing signal generation logic circuit 820 repeatedly carries out the operation of measuring the PIFS time period while holding the BT1 and BT2 transmission permission signals to the respective Bluetooth modules 706 and 707 at a low level (inhibited state), and maintains the high-level portion 920 of the LAN1 transmission permission signal 807 to the wireless LAN module 704 until the count of the beacon repetition period-measuring counter 803 reaches a value corresponding to the end of the contention free period indicated by the high-level portion 902 of the LAN transmission permission internal signal 878.

Then, when the count of the beacon repetition period-measuring counter 803 reaches the value set to the contention free period indicated by the high-level portion 902 of the LAN transmission permission internal signal 878, the timing signal generation logic circuit 820 sets the LAN1 transmission permission signal 807 to the wireless LAN module 704 to a low level, and holds the BT1 and BT2 transmission permission signals 814 and 815 to the respective Bluetooth modules 706 and 707 at a low level until the PIFS time measuring counter (LAN1 counter) 801 assigned to the wireless LAN module 704 overflows. Then, when detecting the signal portion 918 indicative of the overflow of the count of the PIFS time measuring counter 801, the timing signal generation logic circuit 820 presets the PIFS time measuring counter 801 and sets the respective BT1 and BT2 transmission permission signals 814 and 815 to a high level to permit transmission by the respective Bluetooth modules 706 and 707.

When receiving the BT1 and BT2 transmission permission signals 814 and 815, the respective MAC sections 710 and 711 of the Bluetooth modules 706 and 707 start transmission of polling signals to the linked PCs independently. On this occasion, the two independent Bluetooth modules 706 and 707 perform transmission/reception simultaneously, but hopping patterns assigned to the respective Bluetooth modules 706 and 707 are generated from different BD_AD-DRs, which enables almost interference-free communication (the word "almost" used here implies that even when channel control is performed using independent hopping patterns, there is a possibility of the same frequency channel being selected in a certain time slot).

The polling operations of the two independent Bluetooth modules 706 and 707 are continuously carried out until the count of the beacon repetition period-measuring counter 803 of the timing signal generation logic circuit 820 reaches a value corresponding to the start of the next high-level portion 922 of the LAN transmission permission internal signal 878 (the start of the beacon repetition period), i.e. over a time period during which the BT1 and BT2 transmission permission signals 814 and 815 are held at a high level, and when the BT1 and BT2 transmission permission signals 814 and 815 go low upon detection of the start of the next high-level portion 922 of the LAN transmission permission internal signal 878 (next beacon repetition period), the polling operations are temporarily stopped in the same manner as described above with respect to the first embodiment. Upon inhibiting the Bluetooth modules 706 and 707 from performing transmission, the timing signal generation logic circuit 820 sets the LAN1 and LAN2 transmission permission signals 807 and 808 of the wireless LAN modules 704 and 705 to a high level to start the high-level portions of the LAN1 and LAN2 transmission permission signals 807 and 808, and then outputs the pulse 925 of the LAN synchronizing signal 809 for synchronizing the operations of the wireless LAN modules 704 and 705, to cause the modules 704 and 705 to operate in the same manner as described hereinbefore.

Although a link connection means for linking from a PC to the wireless access point 101 is not referred to in the above description of the sequential operations of the wireless LAN modules 704 and 705, when a process for the linking takes place within the contention free period, the polling operation is temporarily stopped to execute an operation for link establishment. Also, if a PC which has not yet detected a beacon sends out a probe request by an active scan, the wireless LAN modules 704 and 705 can perform frame reception even when the LAN1 and LAN2 transmission permission signals show the inhibited state. Such a probe request can be responded to by providing the MAC sections 708 and 709 of the wireless LAN modules 704 and 705 with output means responsive to probe requests received by the wireless LAN modules 704 and 705, for outputting reception state-indicative signals even in a time period over which transmission is inhibited, whereby when high-level portions of a reception state-indicative signals from the wireless LAN modules 704 and 705 are detected, the timing signal generation logic circuit 820 causes BT1 and BT2 transmission permission signals to the Bluetooth modules 706 and 707 to go low at a time point the reception state-indicative signals from the Bluetooth modules go high to thereby inhibit both the controlled Bluetooth modules from performing transmission, and then causes the transmission permission signal to the wireless LAN module 704 (705) to go high, to thereby cause the module 704 (705) to transmit a probe response.

In the present embodiment as well, output means may be provided for outputting information of the beacon repetition period and/or contention free period from the wireless LAN modules 704 and 705, and generate transmission permission signals based on the information outputted from the output means, similarly to the first embodiment.

Although in the present embodiment, the LAN synchronizing signal is outputted for synchronizing the operations of the wireless LAN modules 704 and 705, it is possible to obtain the same effects by sequentially giving instructions for starting operations of the wireless LAN modules 704 and 705 during initial synchronization thereof, to thereby cause the modules 704 and 705 to operate in respective timings close to each other, and synthesizing the timings of contention free periods notified from the LAN1 and LAN2 wireless LAN modules 704 and 705 so as to avoid interference.

In the present embodiment, the IEEE 802.11-based wireless communication method is employed for the wireless LAN modules 704 and 705, but what is essential to the present invention is congestion control by the MAC section, and is not limited by the modulation method of the wireless control system. Therefore, the present invention is applicable to all apparatuses employing a MAC control means defined by any of the IEEE 802.11 standards including IEEE 802.11, IEEE 802.11b, and IEEE 802.11g, and all IEEE 802.15-based apparatuses having a MAC control means similar to the IEEE 802.11 MAC control means.

Further, in the above-described embodiments, in a time period over which communication of a wireless LAN module is allowed, the PCF is applied in an infrastructure mode. However, in the present invention, a counter for measuring the contention free period is provided, and a LAN transmission permission signal is given to the wireless LAN module based on the measured period. Therefore, even if the wireless LAN module does not use the PCF but is designed to carry out communication control using the DCF according to the CSMA/CA protocol, the same effects can be obtained using a contention free period measuring counter to measure a transmission permission time period for the wireless LAN module. In this case, there is a possibility that a wireless LAN signal is received during a transmission permission time period for a Bluetooth module. However, as described hereinbefore, interference can be avoided by the means for temporarily stopping transmission by the Bluetooth module based on a change in the state or level of a reception state-indicative signal from the wireless LAN module.

Further, by mounting a Bluetooth antenna and a wireless LAN antenna at respective locations with little interference in a frequency range close to respective frequency ranges of communication channels (the frequency ranges do not overlap), and applying the adaptive hopping to the Bluetooth module, it is possible to disregard a reception state-indicative signal from the wireless LAN module during a time period over which transmission by the Bluetooth module is permitted, to secure a communication time for the Bluetooth module.

Although in the above-described embodiments, a wireless LAN module and a Bluetooth module were described as being disposed on the same circuit board, this is not limitative, but this disposition is not limitative, and a wireless LAN module and a Bluetooth module may be freely disposed, for example, disposed separately, insofar as timing signals for the modules are connected to a control logic section that generates transmission/reception timing control signals.

It is to be understood that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium on which the program code is stored constitute the present invention.

Further, it is to be understood that the functions of either of the above described embodiments may be accomplished not only by executing the program code read out by a computer, but also by causing an OS (operating system) or the like which operates on the computer to perform a part or all of the actual operations according to instructions of the program code.

Further, it is to be understood that the functions of either of the above described embodiments may be accomplished by writing the program code read out from the storage medium into a memory provided on an expansion board inserted into a computer or in an expansion unit connected to the computer and then causing a CPU or the like provided in the expansion board or the expansion unit to perform a part or all of the actual operations according to instructions of the program code.

Further, the above program code has only to realize the functions of either of the above described embodiments on a computer, and the form of the program may be an object code, a program code executed by an interpreter, or script data supplied to an OS.

Examples of the storage medium for supplying the program code include a RAM, an NV-RAM, a floppy (registered trademark) disk, an optical disk, a magnetic-optical disk, a CD-ROM, a CD-R, a CD-RW, a DVD (DVD-ROM, DVD-RAM, DVD-RW, DVD+RW), a magnetic tape, a nonvolatile memory card, and a ROM. Alternatively, the program may be downloaded from another computer, a database, or the like, not shown, connected to the Internet, a commercial network, a local area network, or the like.

What is claimed is:

1. A control section of a wireless communication apparatus that performs communication by a first wireless communication module and by a second wireless communication module capable of performing communication according to a polling method and according to a contention communication method, the control section comprising:
    assigning means for assigning a first time period in which the second wireless communication module is allowed to perform communication according to the polling method as a communication period for the second wireless communication module according to the polling method, while assigning a second time period in which the second wireless communication module is allowed to perform communication according to the contention communication method as a communication period for the first wireless communication module;
    controlling means for repeatedly controlling communication by the first wireless communication module and the second wireless communication module according to the assignment of the communication period by the assigning means; and
    changing means for terminating the first time period assigned by the assigning means in a reduced period and starting the second time period when the communication by the second wireless communication module according to the polling method is completed before expiration of the first time period.

2. A control section of a wireless communication apparatus according to claim 1, wherein the first wireless communication module and the second wireless communication module perform communication according to mutually different wireless communication methods.

3. A control section of a wireless communication apparatus according to claim 1, wherein the controlling means inhibits communication by the first wireless communication module in the first time period.

4. A control section of a wireless communication apparatus according to claims 1, wherein the controlling means outputs communication permission signals respectively to the first wireless communication module and the second wireless communication module to permit communication by the respective wireless communication modules.

5. A control section of a wireless communication apparatus according to claims 1, wherein when the second wireless communication module completes communication with a communication partner in the first time period, the changing means terminates the first time period before expiration of the first time period assigned by the assigning means and starts the second time period.

6. A control section of a wireless communication apparatus according to claims 1, wherein the first wireless communication module and the second wireless communication module perform communication using frequency bands overlapping each other.

7. A wireless communication apparatus having a control section that controls a first wireless communication section and a second wireless communication section capable of performing communication according to a polling method and according to a contention communication method, the wireless communication apparatus comprising:

assigning means for assigning a first time period in which the second wireless communication section is allowed to perform communication according to the polling method as a communication period for the second wireless communication section according to the polling method, while assigning a second time period in which the second wireless communication section is allowed to perform communication according to the contention communication method as a communication period for the first wireless communication section; and controlling means for repeatedly controlling communication by the first wireless communication module and the second wireless communication module according to the assignment of the communication period by the assigning means; and changing means for terminating the first time period assigned by the assigning means in a reduced period and starting the second time period when the communication by the second wireless communication module according to the polling method is completed before expiration of the first time period.

8. A wireless communication apparatus according to claim 7, wherein the control section inhibits communication by the first wireless communication module in the first time period.

9. A wireless communication apparatus according to claim 7, wherein the control section outputs communication permission signals respectively to the first wireless communication section and the second wireless communication section to permit communication by the respective wireless communication sections.

10. A wireless communication apparatus according to claim 7, wherein when the second wireless communication section completes communication with a communication partner in the first time period, the changing means terminates the first time period before expiration of the first time period assigned by the assigning means and starts the second time period.

11. A control method of controlling a first wireless communication section and a second wireless communication section capable of performing communication according to a polling method and according to a contention communication method among a plurality of wireless communication sections of a single communication apparatus, the control method comprising:

an assigning step of assigning a first time period in which the second wireless communication section is allowed to perform communication according to the polling method as a communication period for the second wireless communication section according to the polling method, while assigning a second time period in which the second wireless communication section is allowed to perform communication according to the contention communication method as a communication period for the first wireless communication section; and a controlling step of repeatedly controlling communication by the first wireless communication section and the second wireless communication section according to the assignment of the communication period at the assigning step; and a changing step of terminating the first time period assigned at the assigning step in a reduced period and starting the second time period when the communication by the second wireless communication section according to the polling method is completed before expiration of the first time period.

* * * * *

UNITED STATES PATENT AND TRADEMARK OFFICE
CERTIFICATE OF CORRECTION

| | | |
|---|---|---|
| PATENT NO. | : 7,257,099 B2 | Page 1 of 1 |
| APPLICATION NO. | : 10/889832 | |
| DATED | : August 14, 2007 | |
| INVENTOR(S) | : Toshihiko Myojo | |

It is certified that error appears in the above-identified patent and that said Letters Patent is hereby corrected as shown below:

Column 24, Line 53, change "claims" to --claim--.

Column 24, Line 59, change "claims" to --claim--.

Column 24, Line 66, change "claims" to --claim--.

Signed and Sealed this

Fourth Day of December, 2007

JON W. DUDAS
*Director of the United States Patent and Trademark Office*